United States Patent
Narita et al.

(10) Patent No.: US 6,599,220 B2
(45) Date of Patent: Jul. 29, 2003

(54) CONTROL OF INFINITELY VARIABLE TRANSMISSION

(75) Inventors: Yasushi Narita, Yokohama (JP);
Yoshinori Iwasaki, Yokosuka (JP);
Tatsuya Nagato, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/087,943

(22) Filed: Mar. 5, 2002

(65) Prior Publication Data

US 2002/0128115 A1 Sep. 12, 2002

(30) Foreign Application Priority Data

Mar. 9, 2001 (JP) ........................ 2001-066289

(51) Int. Cl.[7] .............................................. B60K 41/12
(52) U.S. Cl. ................................ 477/37; 477/904
(58) Field of Search .......................... 477/37, 115, 120, 477/904, 908

(56) References Cited

U.S. PATENT DOCUMENTS

| | | | | |
|---|---|---|---|---|
| 4,622,865 A | * | 11/1986 | Itoh et al. ............... | 477/120 X |
| 4,989,149 A | * | 1/1991 | Mimura et al. ............... | 701/95 |
| 5,001,900 A | * | 3/1991 | Sasajima et al. ......... | 477/904 X |
| 5,730,680 A | * | 3/1998 | Toukura ................. | 477/904 X |
| 5,754,428 A | * | 5/1998 | Ishikawa .................. | 477/37 X |
| 6,165,101 A | * | 12/2000 | Takizawa et al. ............. | 477/37 |
| 6,312,357 B1 | * | 11/2001 | Sakai et al. .................... | 477/37 |

FOREIGN PATENT DOCUMENTS

| | | | |
|---|---|---|---|
| JP | 09249103 | * | 9/1997 |
| JP | 2000-179674 | | 6/2000 |

* cited by examiner

*Primary Examiner*—Charles A Marmor
*Assistant Examiner*—Roger Pang
(74) *Attorney, Agent, or Firm*—Foley & Lardner

(57) ABSTRACT

A controller (80) calculates a target speed ratio of a continuously variable transmission (2) incorporated into an infinitely variable transmission for a vehicle and a target vehicle acceleration based on a vehicle running state. When a predetermined creep torque control condition holds (S90–S93, S101), the controller (80) corrects the target speed ratio such that the deviation of the target acceleration from the real vehicle acceleration to decrease. By controlling the speed ratio of the continuously variable transmission to the corrected target speed ratio, the infinitely variable transmission generates a creep torque consistent with the driver's intention.

13 Claims, 26 Drawing Sheets

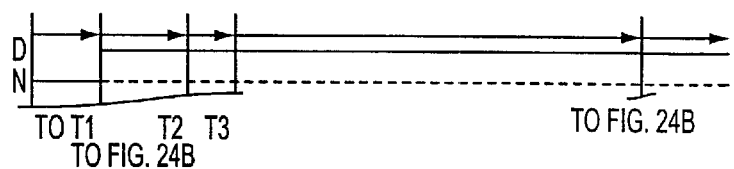
FIG. 24A RNG
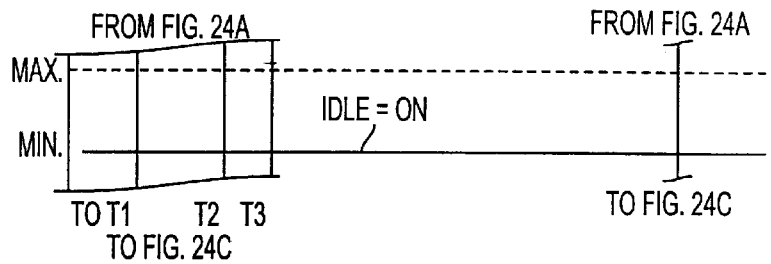
FIG. 24B APS
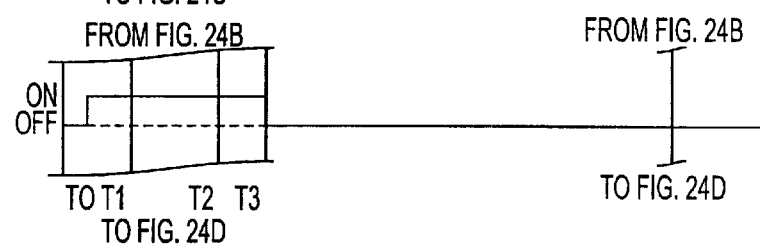
FIG. 24C BRK
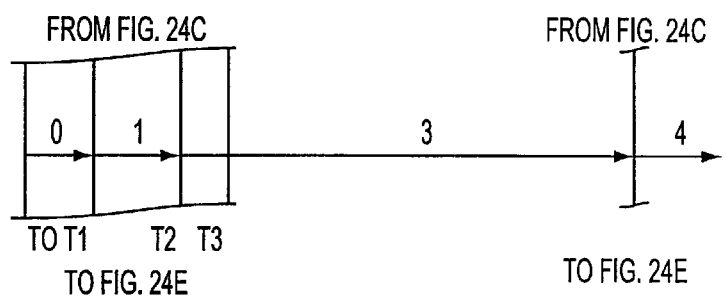
FIG. 24D SFTMODE
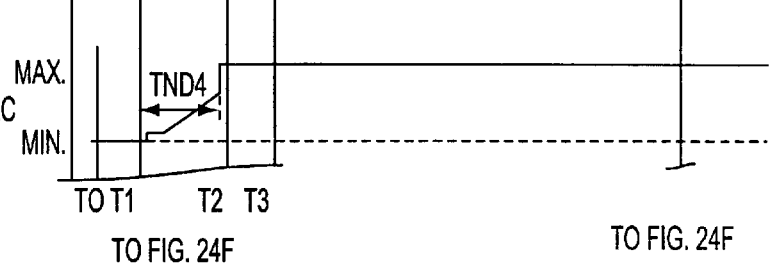
FIG. 24E DSRPRSLC
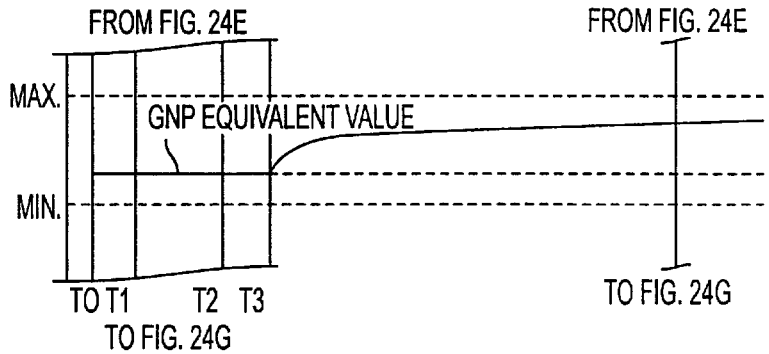
FIG. 24F DSRSTP FIG. 24G TSRTOMFL 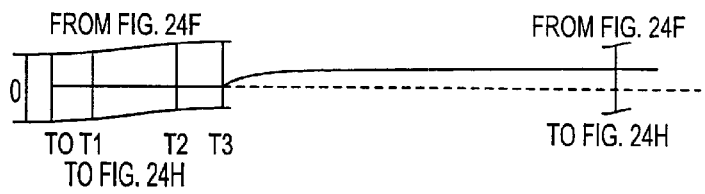
FIG. 24H GFBRTO 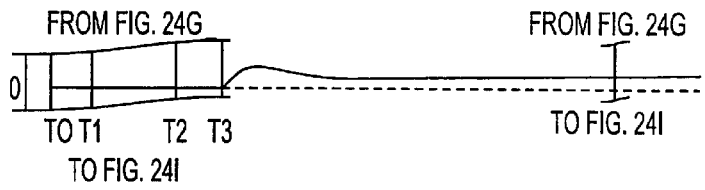
FIG. 24I CVT SPEED RATIO 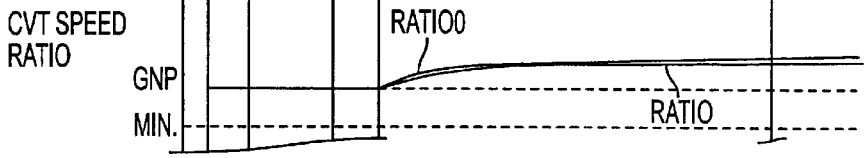
FIG. 24J Ne 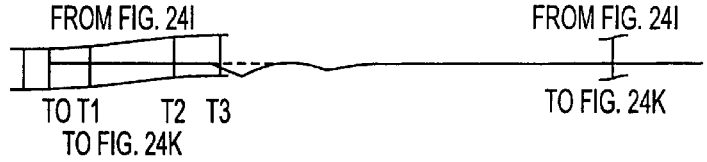
FIG. 24K VEHICLE SPEED 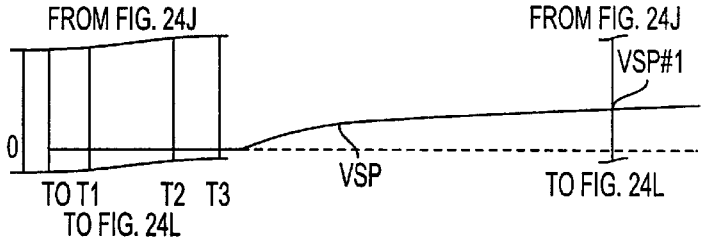
FIG. 24L ACCELERATION 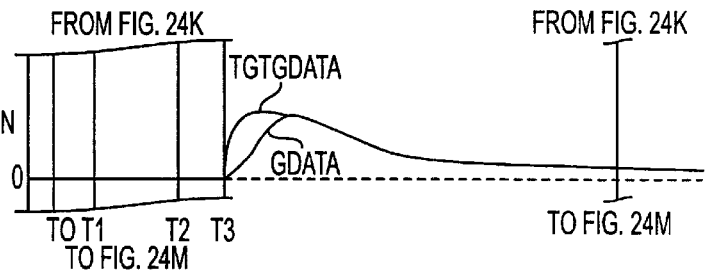
FIG. 24M OUTPUT TORQUE 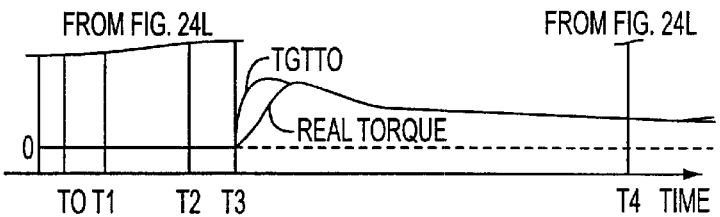

CONTROL OF INFINITELY VARIABLE TRANSMISSION

FIELD OF THE INVENTION

This invention relates to control of an infinitely variable transmission of a vehicle.

BACKGROUND OF THE INVENTION

Tokkai 2000-179674 published by the Japanese Patent Office in 2000 discloses an infinitely variable transmission (IVT) in which a continuously variable transmission (CVT), a fixed speed ratio transmission and a planetary gear set are combined.

The speed ratio of the IVT (IVT speed ratio) arbitrarily varies from forward to reverse, including a geared neutral point (GNP) at which the speed ratio becomes infinite, by changing the speed ratio of the CVT (CVT speed ratio).

At GNP, the output shaft of the IVT stops. In other words, only the variation in the CVT speed ratio allows change-over between forward and reverse operation without using a forward/reverse change-over mechanism.

SUMMARY OF THE INVENTION

In this IVT, the CVT speed ratio is controlled based on the accelerator pedal depression and vehicle speed. Even when the accelerator pedal is not depressed, a small torque is transmitted to the drive wheels of the vehicle to cause the vehicle to creep, i.e., to make the vehicle move at a low speed. The creep torque transmitted to the drive wheels in this state is obtained through CVT speed ratio control wherein the CVT speed ratio is feedback controlled so that the real vehicle speed detected by the vehicle speed sensor coincides with the target vehicle creep speed.

As a result, when a driver depresses the brake pedal in order to stop the vehicle at low speed, the difference between the real vehicle speed and the target vehicle creep speed increases and the CVT speed ratio is controlled to increase the creep torque transmitted to the drive wheels in order to achieve the target vehicle creep speed.

This increase in the creep torque is opposite to the intention of the driver who operates the brake to stop the vehicle, and the driver may experience an uncomfortable feeling.

Further, the design of the IVT results in the following output torque characteristics. When the CVT speed ratio corresponds to GNP, the torque transmitted from IVT to the drive wheels is zero. When the CVT speed ratio is slightly increased from the GNP, the output torque of the IVT undergoes a large and abrupt increase, and then it gradually decreases as the CVT speed ratio further increases. Such an abrupt increase in the output torque of the IVT may adversely affect the smooth starting of the vehicle.

It is therefore an object of this invention to optimize the creep torque of a vehicle equipped with an IVT through the speed ratio control thereof.

In order to achieve the above object, this invention provides a control device for such an infinitely variable transmission for a vehicle that comprises an input shaft, a continuously variable transmission which outputs the rotation of the input shaft at an arbitrary speed ratio, a fixed speed ratio transmission which outputs the rotation of the input shaft at a fixed speed ratio, and an output shaft which changes a rotation direction and a rotation speed according to a difference between an output rotation speed of the continuously variable transmission and an output rotation speed of the fixed speed ratio transmission.

The control device comprises a sensor which detects a running state of the vehicle, a sensor which detects a real vehicle acceleration, and a programmable controller that controls the speed ratio of the continuously variable transmission.

The controller is programmed to calculate a target speed ratio of the continuously variable transmission based on the running state of the vehicle, set a target vehicle acceleration based on the running state of the vehicle, calculate an acceleration deviation of the target vehicle acceleration from the real vehicle acceleration, determine if a predetermined creep torque control condition holds based on the running state of the vehicle, calculate a corrected target speed ratio, if the predetermined condition holds, to cause the acceleration deviation to decrease, and control the speed ratio of the continuously variable transmission based on the corrected target speed ratio.

The controller may alternatively be programmed to calculate a target speed ratio of the continuously variable transmission based on the running state of the vehicle, set a target vehicle acceleration based on the running state of the vehicle, determine if a predetermined creep torque control condition holds based on the running state of the vehicle, calculate a corrected target speed ratio, if the predetermined condition holds, to cause a ratio of the rotation speed of the input shaft with respect to the rotation speed of the output shaft to become smaller as the target vehicle acceleration becomes larger, and control the speed ratio of the continuously variable transmission based on the corrected target speed ratio.

This invention also provides a control method for the above described infinitely variable transmission. The control method comprises detecting a running state of the vehicle, detecting a real vehicle acceleration, calculating a target speed ratio of the continuously variable transmission based on the running state of the vehicle, setting a target vehicle acceleration based on the running state of the vehicle, calculating an acceleration deviation of the target vehicle acceleration from the real vehicle acceleration, determining if a predetermined creep torque control condition holds based on the running state of the vehicle, calculating a corrected target speed ratio, if the predetermined condition holds, to cause the acceleration deviation to decrease, and controlling the speed ratio of the continuously variable transmission based on the corrected target speed ratio.

The details as well as other features and advantages of this invention are set forth in the remainder of the specification and are shown in the accompanying drawings.

BRIEF DESCRIPTION OF THE DRAWINGS

FIGS. 24A–24M are timing charts showing an example of control by the speed ratio control device.

DESCRIPTION OF THE PREFERRED EMBODIMENTS

Figure 1:
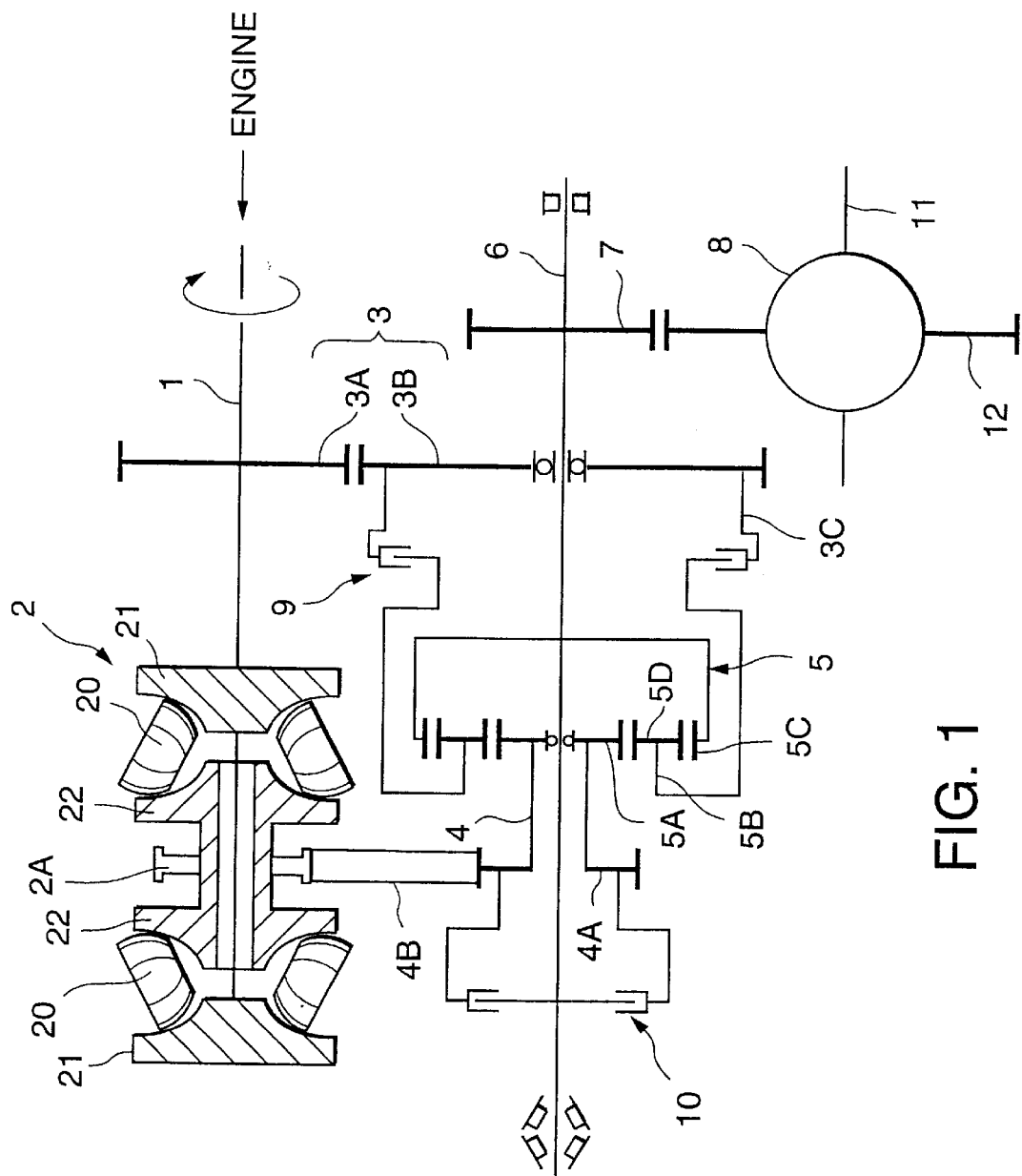
FIG. 1 is a schematic diagram of an infinitely variable transmission (IVT) to which this invention is applied.

Referring to FIG. 1 of the drawings, an infinitely variable transmission (referred to hereafter as IVT) comprises an input shaft 1 connected to an engine of a vehicle, a toroidal continuously variable transmission (referred to hereafter as CVT) 2, a reduction gear set 3 as a fixed speed ratio transmission, a planetary gear set 5, and an output shaft 6.

The input shaft 1 is connected to an input gear 3A of the reduction gear set 3. A CVT input shaft 1B of the CVT 2 rotates together with the input shaft 1 via a loading cam, not shown.

The CVT 2 comprises two sets of toroidal units comprising an input disk 21 and output disk 22. A pair of power rollers 20 are gripped between these facing input disk 21 and output disk 22. The rotation of the two output disks 22 is output from a sprocket 2A to a sprocket 4A supported free to rotate on the output shaft 6 arranged parallel to the CVT input shaft 1B via a chain 4A.

The reduction gear set 3 is provided with an output gear 3B supported free to rotate on the output shaft 6. The output gear 3B meshes with the input gear 3A, and the rotation of the input shaft 1 is output to the output gear 3B after reduction according to a gear ratio of the input gear 3A and output gear 3B.

The planetary gear set 5 comprises a sun gear 5A, planet gears 5D, ring gear 5C and a planet carrier 5B which supports planet gears 5D. The sun gear 5A is connected to the sprocket 4A via a sleeve-shaped hollow shaft 4 supported on the circumference of the output shaft 6. The sprocket 4A is also connected to the output shaft 6 via a direct clutch 10.

The planet gears 5D are plural pinions arranged between the sun gear 5A and ring gear 5C, and are supported free to rotate and free to turn around the sun gear 5A by the planet carrier 5B. The output gear 3B of the reduction gear set 3 and the planet carrier 5B are connected via a power recirculation clutch 9.

The ring gear 5C is connected to the output shaft 6.

A final output gear 7 is fixed to the output shaft 6. The rotation of the final output gear 7 is output to a vehicle drive shaft 11 via a final gear 12 and differential 8.

The speed ratio ii of this IVT is expressed as the ratio of the rotation speed INREV of the input shaft 1 and rotation speed OUTREV of the output shaft 6. The speed ratio ic of the CVT 2 is expressed as the ratio of the rotation speeds of the input disk 21 and output disk 22. The rotation speed of the input disk 21 is equal to the rotation speed INREV of the input disk 1.

In the following description, the speed ratio ii of the IVT is referred to as IVT speed ratio and the speed ratio ic of the CVT 2 is referred to as CVT speed ratio.

Figure 2:
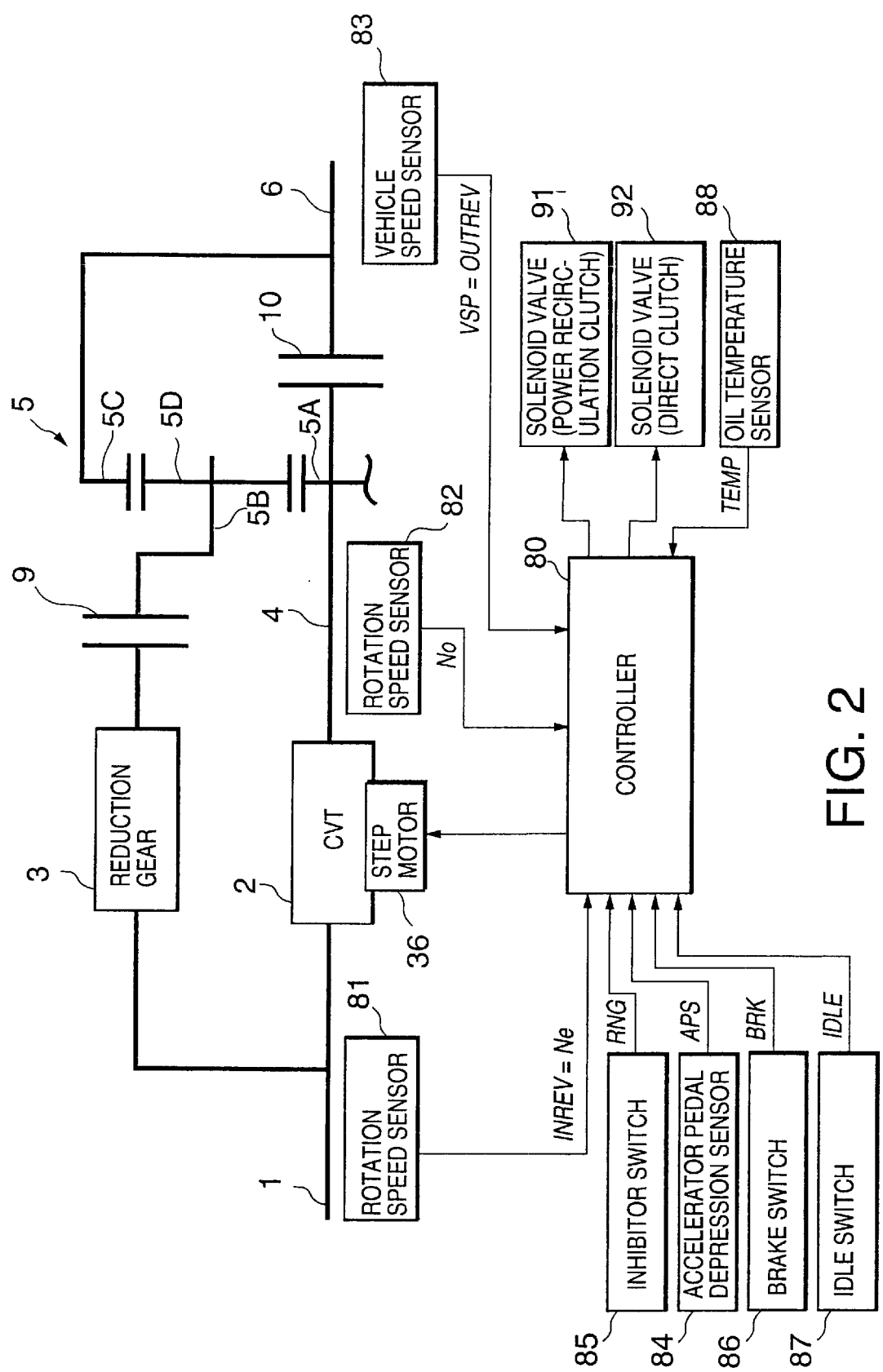
FIG. 2 is a schematic diagram of a speed ratio control device according to this invention.

Referring to FIG. 2, a rotation speed sensor 81 which detects the rotation speed of the input gear 3A of the reduction gear set 3, and a rotation speed sensor 82 which detects the rotation speed No of the sprocket 4A, are installed in the IVT. Here, the rotation speed of the input gear 3A is equal to the rotation speed INREV of the input shaft 1 and CVT input shaft 1B and it is also equal to the rotation speed Ne of the engine. The rotation speed No of the sprocket 4A is equal to the rotation speed of the sun gear 5A. The rotation speed INREV and rotation speed No respectively input as signals to a controller 80.

The controller 80 comprises one or a plurality of microcomputers each of which is provided with a central processing unit (CPU), read-only memory (ROM), random access memory (RAM) and input/output interface (I/O interface).

The vehicle is provided with a brake pedal, accelerator pedal and a range selector lever.

A brake signal BRK from a brake switch 86 which detects whether or not the brake pedal is depressed, a depression amount signal APS from an accelerator pedal depression sensor 84 which detects a depression amount of the accelerator pedal, a selection range signal RNG from an inhibitor switch 85 which detects a selection range of the selector lever, an idle signal IDLE from a idle switch 87 which detects whether or not the engine is idling, and an oil temperature signal TEMP from an oil temperature sensor 88 which detects an oil temperature in the CVT 2 are also input to the controller 80. The selection range signal RNG differentiates between a low range (L), drive range (D), reverse range (R), neutral range (N) and park range (P).

Based on these signals, the controller 80 engages and releases the power recirculation clutch 9 via a solenoid valve 91 and the direct clutch 10 via a solenoid valve 92. The speed ratio and transmission torque during forward motion and reverse motion of the vehicle are also controlled by varying the speed ratio ic of the CVT 2.

In a direct mode, wherein the power recirculation clutch 9 is released and the direct clutch 10 is engaged, the IVT outputs the output rotation of the toroidal CVT 2 to the final output shaft 6. On the other hand, in a power recirculation mode wherein the power recirculation clutch 9 is engaged and the direct clutch 10 is disengaged, the IT varies the rotation direction and rotation speed of the output shaft 6 according to the speed difference between the output rotation of the toroidal CVT 2 and output rotation of the reduction gear set 3.

Figure 3:
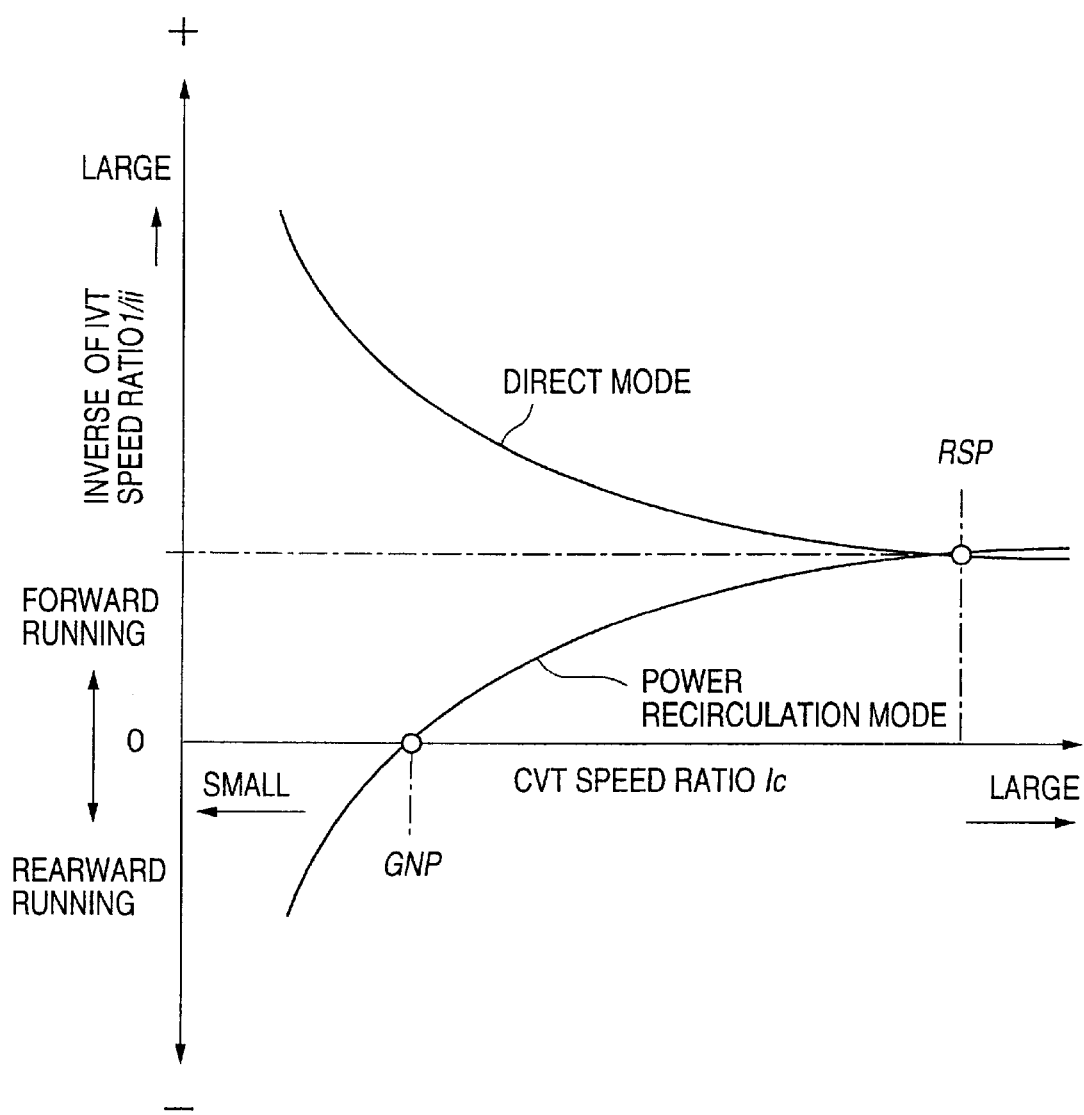
FIG. 3 is a diagram showing the characteristics of a map of an IVT speed ratio ii stored by a controller according to this invention.

The controller 80 stores a map having the characteristics shown in FIG. 3, and by referring to this map, applies the power recirculation mode when the vehicle is reversing and when it is moving forward at a low speed where the IVT speed ratio ii is large, and applies the direct mode when it is moving forward at is high speed where the IVT speed ratio ii is small. The change-over between these modes is performed at a revolution synchronization point (RSP) where the rotation of the output shaft 6 is equal in both modes. In the power recirculation mode, the rotation direction of the output shaft 6 is changed over at a geared neutral point (GNP) where the output shaft 6 stops its rotation.

The CVT speed ratio ic varies according to the gyration angle of the power rollers 20. The gyration angle of the power rollers 20 is controlled by a step motor 36. The controller 80 controls the speed ratio ic of the CVT 2 by outputting a step number corresponding to a target speed ratio to the step motor 36.

Figure 4:
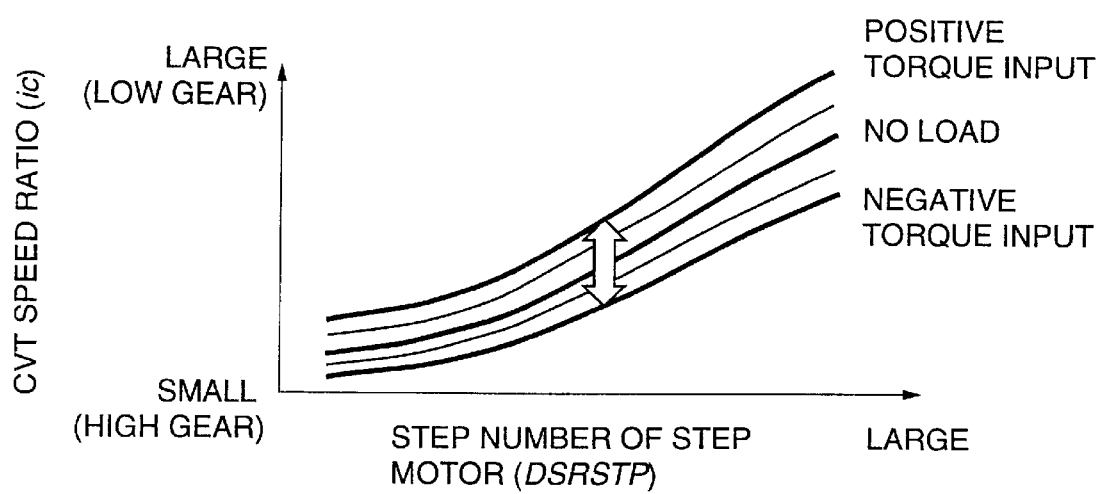
FIG. 4 is a diagram showing a relation between a step number of a step motor and a CVT speed ratio ic.

Referring to FIG. 4, the relation between the CVT speed ratio ic and the step number input to the step motor 36 from the controller 80 will be explained. In a toroidal CVT, when the input torque increases in a positive direction, the CVT speed ratio tends to increase, i.e., it tends to vary in the direction towards low gear, and when the input torque tends to decrease, i.e., it tends to vary in the direction towards high gear. This phenomenon is known as a torque shift.

In the IVT, the direction of torque passing through the CVT 2 changes depending on the drive mode. When in forward traveling in the power recirculation mode, torque is transmitted from the output disk 22 to the input disk 21. Hereinafter, this torque transmitting direction will be referred to as a negative direction. When the vehicle is travelling rearward or when it is travelling forward in the direct mode, torque is transmitted from the input disk 21 to the output disk 22. This torque transmitting direction will be referred to as a positive direction.

In forward traveling in the power recirculation mode, as the transmitting torque of the CVT 2 in the negative direction increases, the CVT speed ratio tends to decrease, as a result, the IVT speed ratio tends to increase. In order to compensate the torque shift and maintain a predetermined speed ratio, it is required to drive the step motor 36 in a direction opposite to the direction of the variation of the CVT speed ratio due to the torque shift.

Next, the speed ratio control of the IVT by the controller 80 will be described.

The controller 80 refers first to a speed ratio map previously stored in the memory and calculates a final target input shaft rotation speed DSRREV based on the accelerator pedal depression amount APS detected by the accelerator pedal depression sensor 84 and the vehicle speed VSP detected by the vehicle speed sensor 83.

Next, the controller 80 divides the final target input shaft rotation speed DSRREV by the rotation speed OUTREV of the output shaft 6 that is detected by the vehicle speed sensor 83 to calculate a final target IVT speed ratio DIVTRATIO. The CVT speed ratio ic is controlled based on this final target IVT speed ratio DIVTRATIO.

Further, the controller 80 changes over the drive mode by selectively engaging the power recirculation clutch 9 and direct clutch 10 at the revolution synchronization point RSP.

In the power recirculation mode, the controller 80 determines whether or not the vehicle running condition is in the creep torque control region based on the vehicle speed VSP and accelerator pedal depression amount APS.

When the vehicle running condition is in the creep torque control region, the controller 80 calculates a target vehicle acceleration TGTGDATA and control the CVT speed ratio based on the difference between the target vehicle acceleration TGTGDATA and a real vehicle acceleration GDATA.

Referring to the flowcharts of FIGS. 5–11, FIGS. 13–15, FIG. 17 and FIGS. 19 and 20, the routines executed by the controller 80 for the above control will be described.

Figure 5:
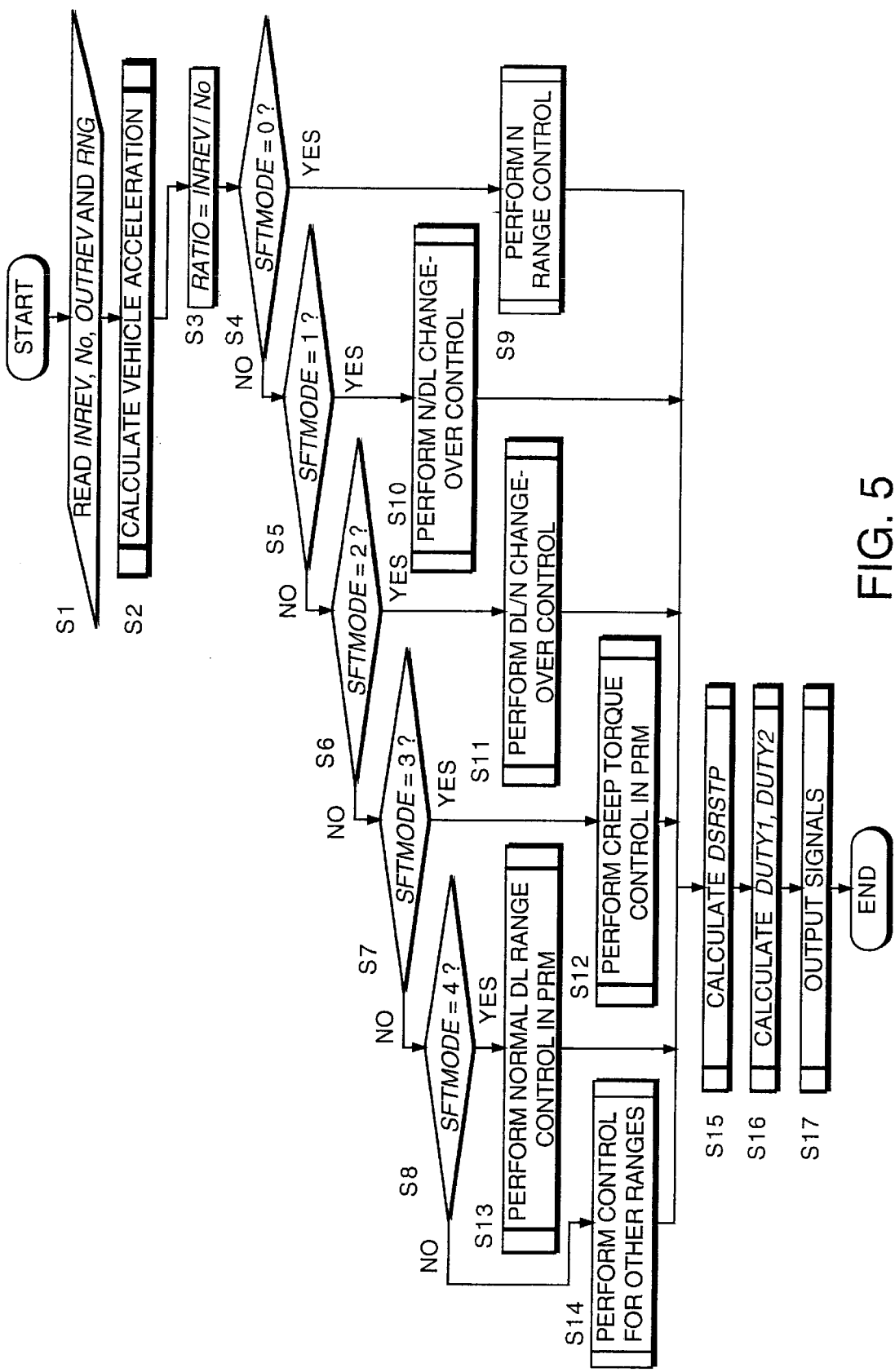
FIG. 5 is a flowchart describing a main routine for speed ratio control executed by the controller.

The flowchart shown in FIG. 5 corresponds to a main routine of the speed ratio control the controller 80 executes.

This routine is executed at periodic intervals of ten milliseconds when the range selector lever selects ranges other than park range (P). All the flowcharts except for FIG. 5 describe subroutines that are executed depending on the execution of the main routine.

Referring to FIG. 5, in a step S1, the controller 80 reads the rotation speed INREV of input shaft 1 and CVT input shaft 1B detected by the rotation speed sensor 81, the rotation speed No of the sprocket 4A detected by the rotation speed sensor 82, the vehicle speed VSP or the rotation speed OUTREV of the output shaft 6 detected by the rotation speed sensor 83, the selection range RNG of the range selector lever detected by the inhibitor switch 85, and the brake signal BRK from the brake switch 86.

Figure 6:
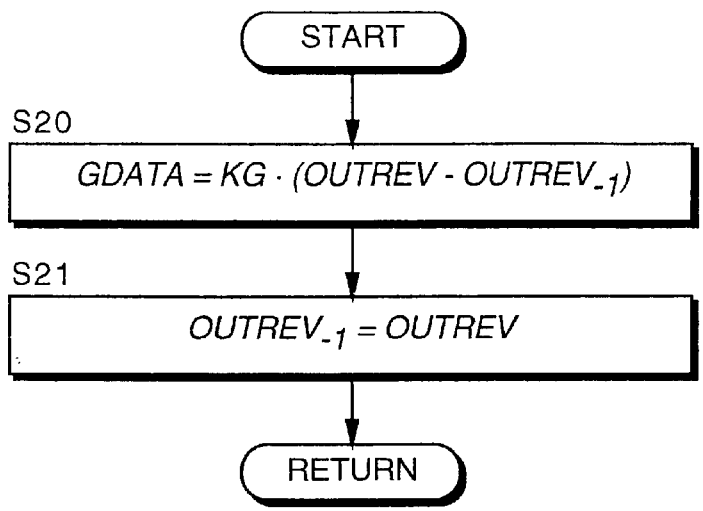
FIG. 6 is a flowchart describing a subroutine executed by the controller for calculating a real vehicle acceleration.

In a next step S2, the controller 80 calculates the real vehicle acceleration GDATA by executing a subroutine shown in FIG. 6.

Referring to FIG. 6, in a first step S20, the controller 80 calculates a difference between the rotation speed OUTREV of the output shaft 6 and a previous value $OUTREV_{-1}$ thereof that was detected on the immediately preceding occasion when the subroutine was executed. The real vehicle acceleration GDATA is then calculated by multiplying the difference by a predetermined constant KG.

In a next step, the controller 80 stores the rotation speed OUTREV of the output shaft 6 as the previous value $OUTREV_{-1}$ in the memory and terminates the subroutine.

Referring again to FIG. 5, after calculating the a real vehicle acceleration GDATA, the controller 80 calculates a real CVT speed ratio RATIO in a next step S3 by dividing the rotation speed INREV of the CVT input shaft 1B by the rotation speed No of the sprocket 4A.

Steps S4 through S8 correspond to determination of a drive mode flag SFTMODE. The drive mode flag SFTMODE is set to any integer including those from zero to four by subroutines that will be described later.

In the step S4, it is determined if the drive mode flag SFTMODE has a value of zero.

Figure 7:
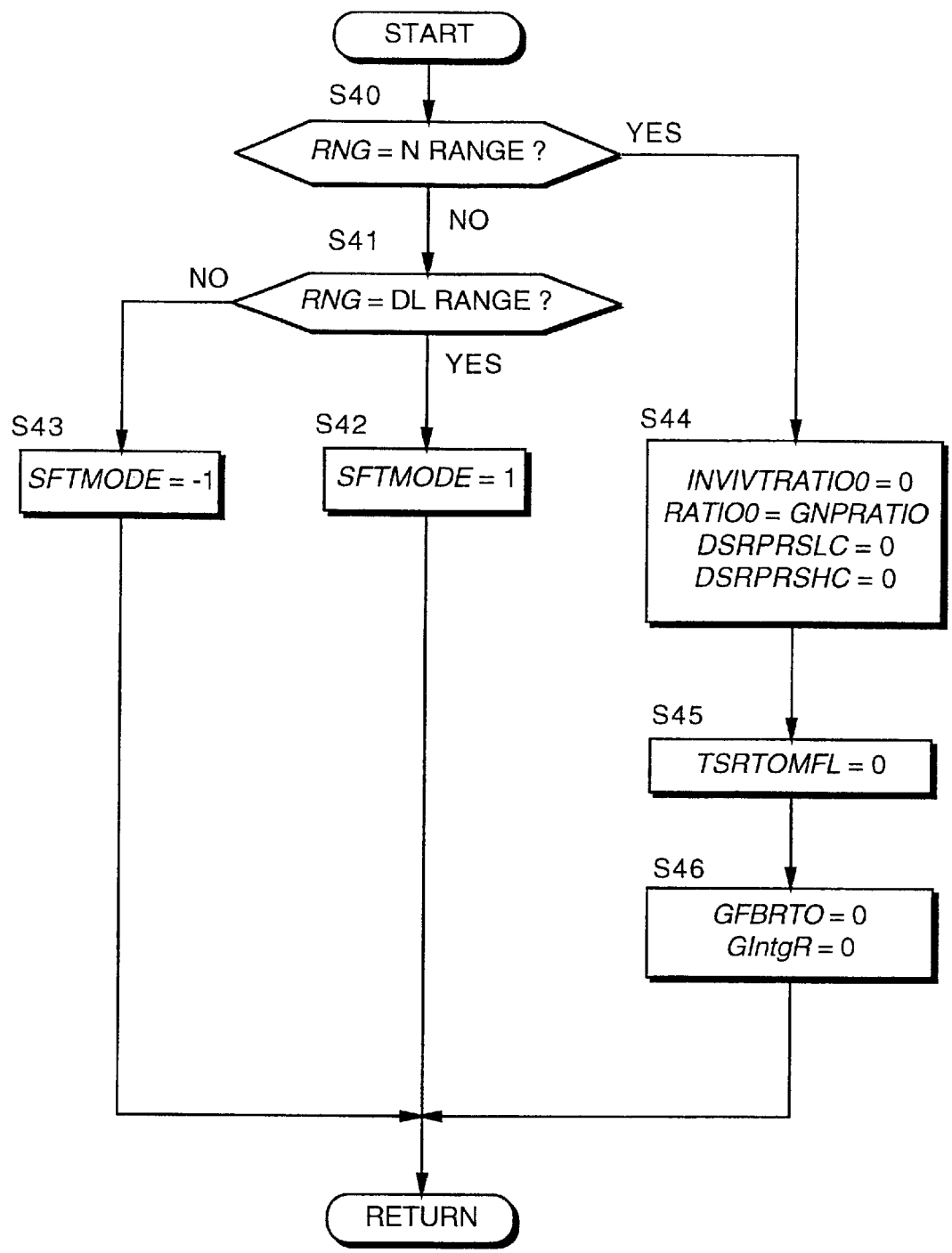
FIG. 7 is a flowchart explaining a subroutine executed by the controller for speed ratio control in a neutral range.

If the drive mode flag SFTMODE has a value of zero, a subroutine for speed ratio control in the neutral range that is shown in FIG. 7 is executed in a step S9.

If the drive mode flag SFTMODE has a value other than zero, it is determined if the flag SFTMODE has a value of unity in the step S5.

Figure 8:
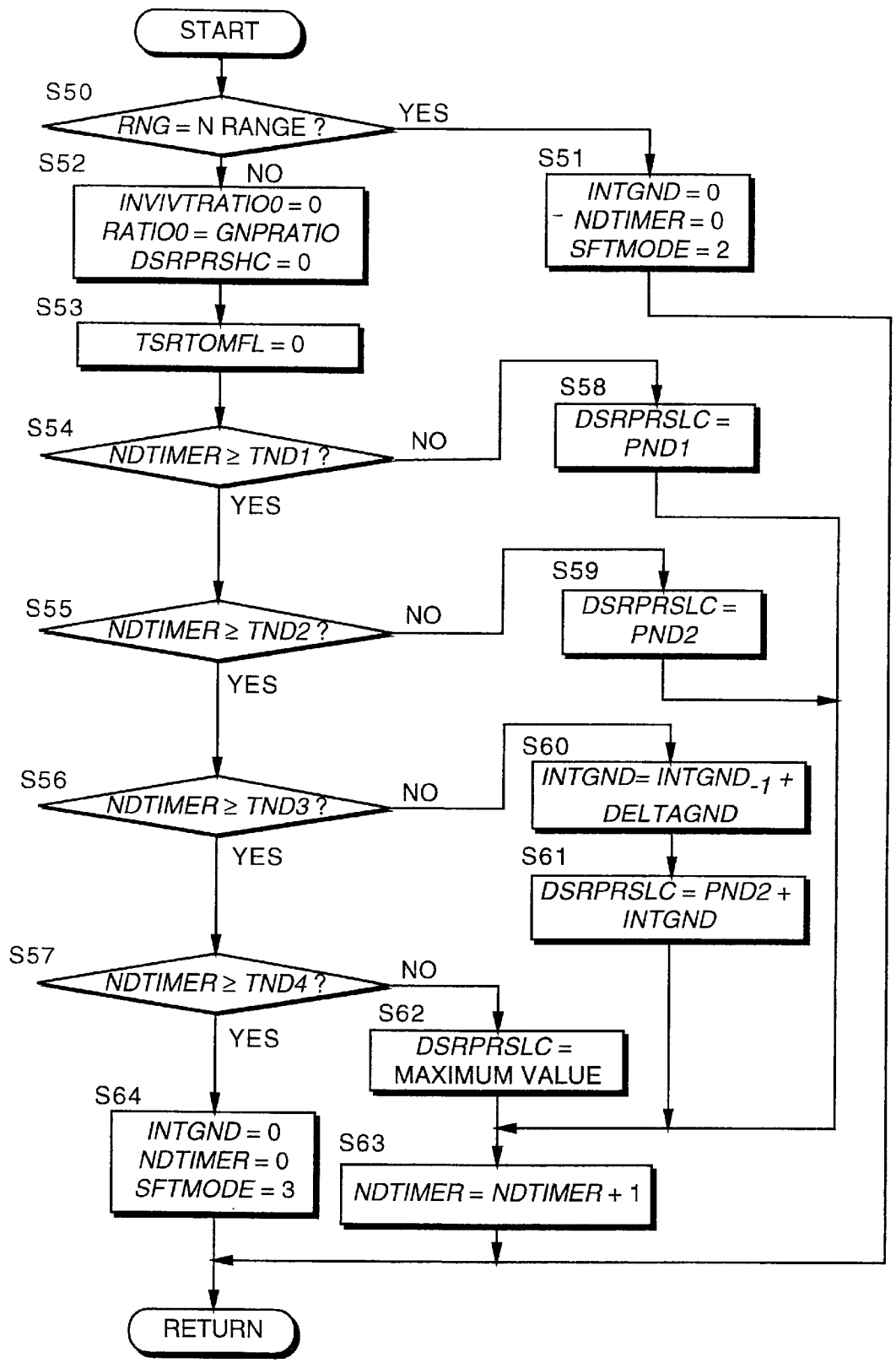
FIG. 8 is a flowchart describing a subroutine executed by the controller for change-over control from the neutral range to a forward travel range.

If the drive mode flag SFTMODE has a value of unity, a subroutine for change-over control from the neutral range to the forward travel range that is shown in FIG. 8 is executed in a step S10.

Herein, the forward travel range denotes any of the drive range (D) or the low range (L) and may be abbreviated as (DL).

If the drive mode has a value other than unity in the step S5, it is determined in the step S6 if it has a value of two.

Figure 9:
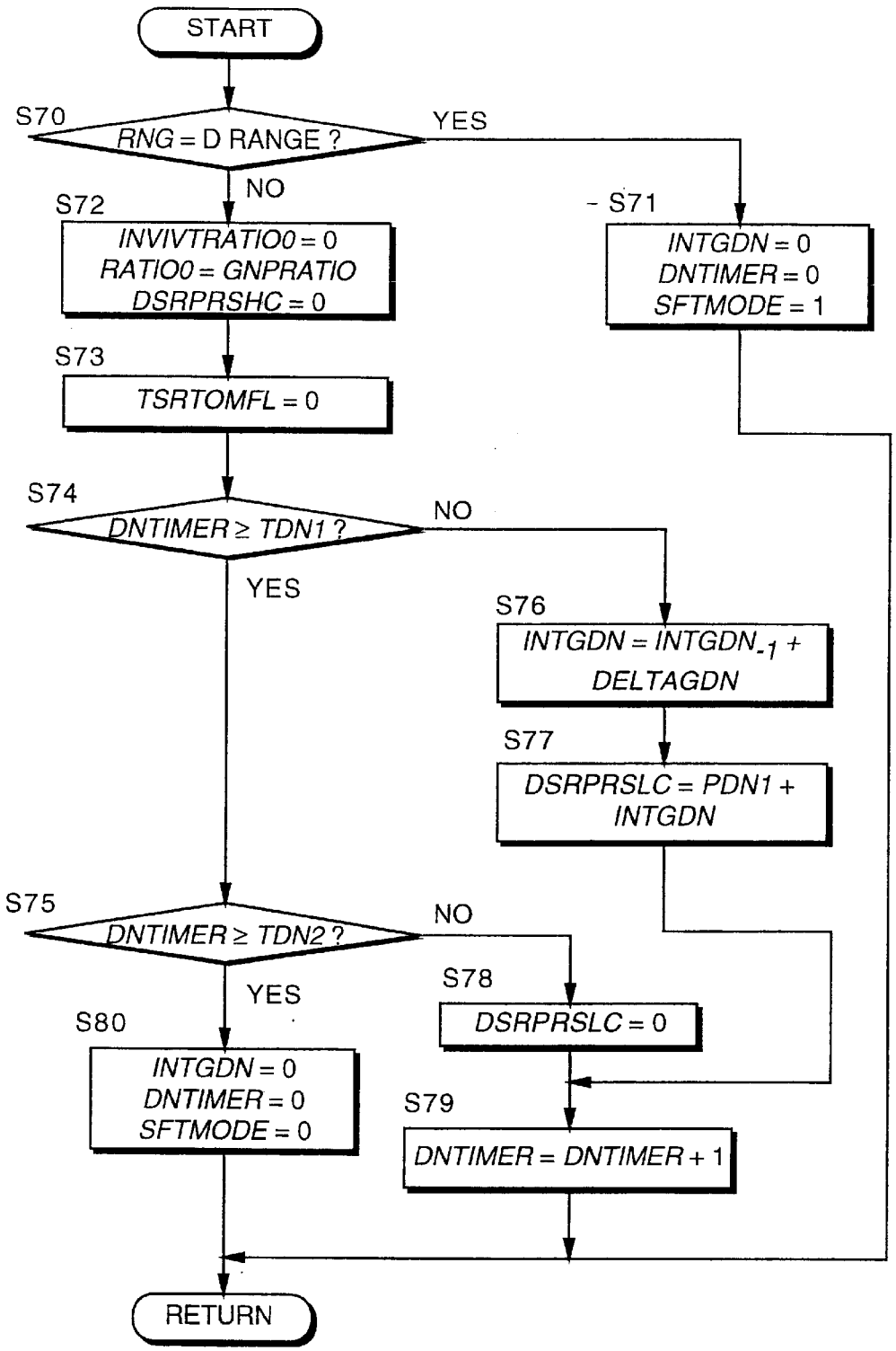
FIG. 9 is a flowchart describing a subroutine for change-over control from the forward travel range to the neutral range, executed by the controller.

If the drive mode flag SFTMODE has a value of two, a subroutine for change-over control from the forward travel range to the neutral range that is shown in FIG. 9 is executed in a step S11.

If the drive mode has a value other than two in the step S6, it is determined in the step S7 if it has a value of three.

Figure 10:
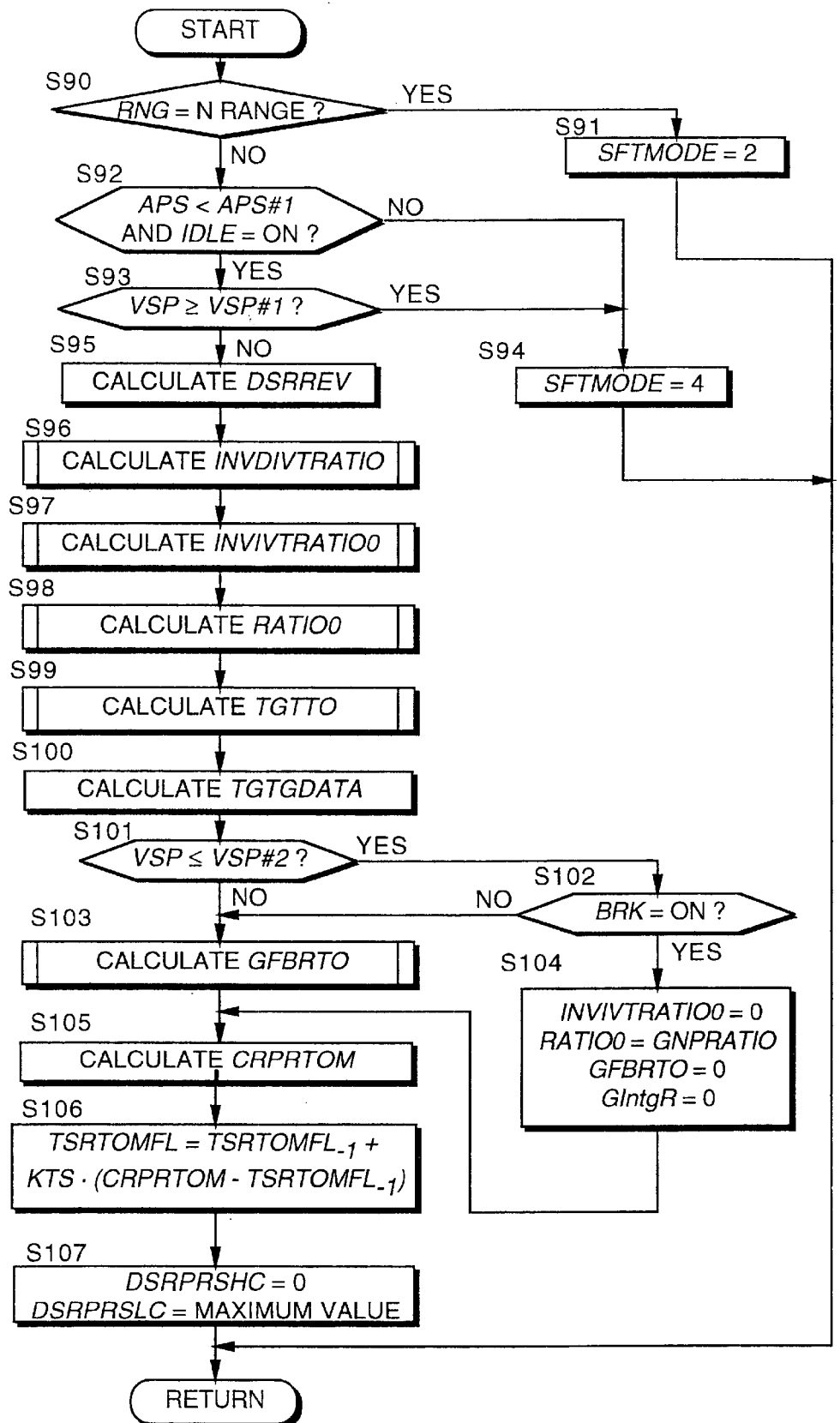
FIG. 10 is a flowchart describing a subroutine executed by the controller for creep torque control in a forward travel range in a power recirculation mode.

If the drive mode has a value of three, a subroutine for creep torque control in the forward travel range in the power recirculation mode that is shown in FIG. 10 is executed in a step S12.

If the drive mode flag SFTMODE has a value other than three in the step S7, it is determined in the step S8 if it has a value of four.

Figure 19:
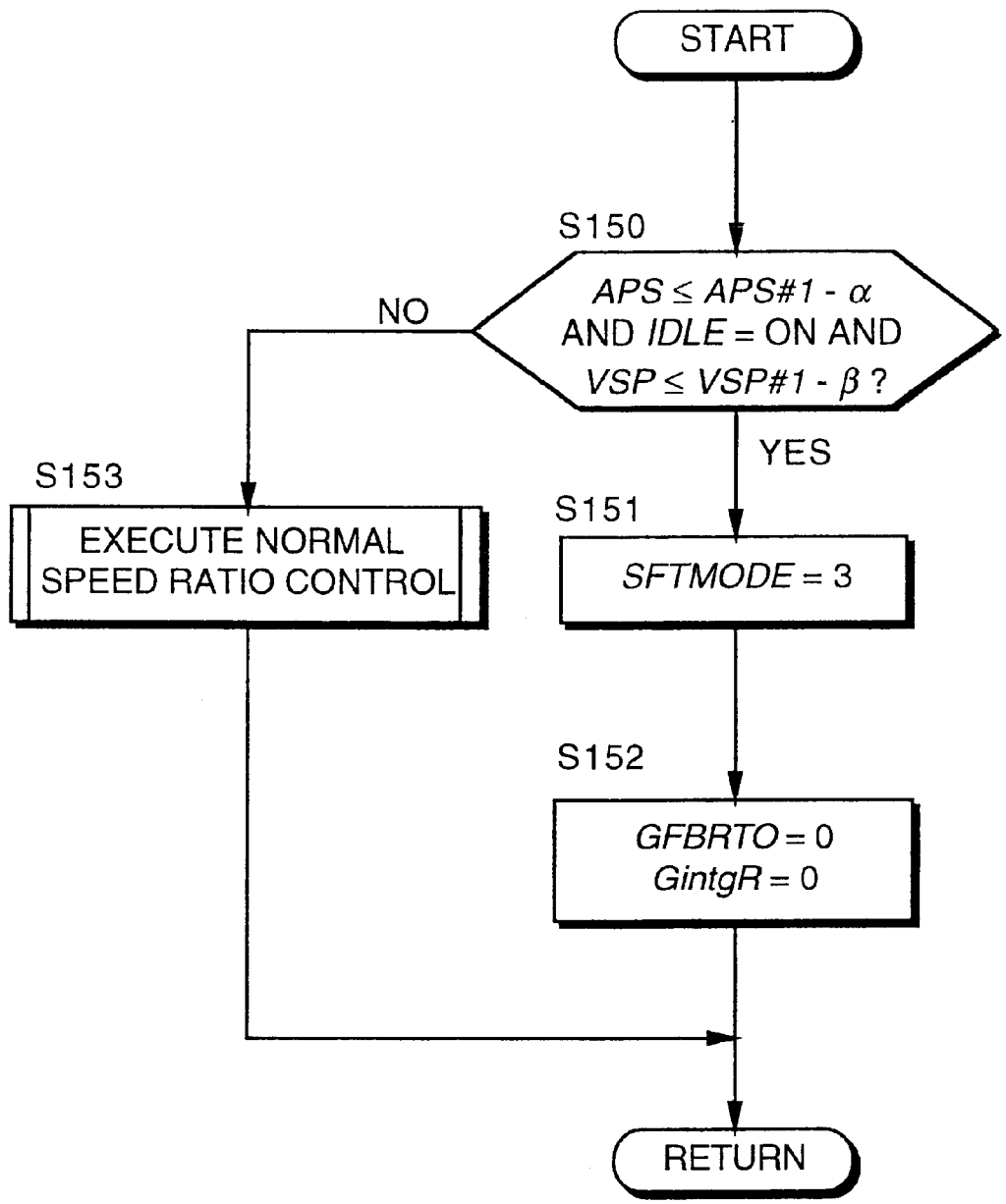
FIG. 19 is a flowchart describing a subroutine executed by the controller for normal speed ratio control in the forward travel range in the power recirculation mode.

If the drive mode flag SFTMODE has a value of four, a subroutine for normal control in the forward travel range in the power recirculation mode that is shown in FIG. 19 is executed in a step S13.

If the drive mode flag SFTMODE has a value other than four in the step S8, a subroutine for the other ranges is executed in a step S14. The other ranges include the drive range in the direct mode and the reverse range.

Although the subroutines applied in these two ranges are totally different from each other, since the control in these two ranges have nothing to do with the subject matter of this invention, these subroutines are represented by the single step S14 and their description is omitted.

With respect to the operation of the range selector lever, it should be noted that the ranges are arranged in a row in the order of park range (P), reverse range (R), neutral range (N), low range (L) and drive range (D). So, when the range selector lever is shifted from the park range (P) or reverse range (R) to the drive range (D), or vice versa, it necessarily passes through the neutral range (N) in the course of its travel. Therefore, the change-over routines between the neutral range and the forward travel range described above can also be applied to change-over between the park or reverse range and the forward travel range.

The drive mode flag SFTMODE determined in the steps S4 through S8 has the value that was set on the immediately preceding occasion when the routine was executed.

If the drive mode flag SFTMODE is zero, for example, it means that the range selector lever was positioned in the neutral range (N) on the immediately preceding occasion when the routine was executed.

The respective subroutines corresponding to the step S9 through the step S14 calculate a command step number DSRSTP of the step motor 36, and parameters for determining duty signals DUTY1, DUTY2 of the solenoid valves 91, 92.

Referring to FIG. 7, a subroutine for the speed ratio control in N range will be described. Herein, N range denotes the neutral range (N).

In a first step S40, it is determined if the present selection range RNG of the range selector lever is indicating the neutral range (N).

If the selection range RNG is indicating the neutral range (N), it means that the neutral range (N) continues from the immediately preceding occasion when the routine was executed. In this case, the subroutine proceeds to a step S44.

If the selection range RNG is not indicating the neutral range (N), it means that the range selector lever has been shifted from the neutral range (N) to one of the other ranges.

In this case, the subroutine proceeds to a step S41.

In the step S41, it is determined if the selection range RNG indicates the forward travel range (DL), i.e., the drive range (D) or the low range (L). When the selection range RNG is indicating the forward travel range (DL), the controller 80 sets the drive mode flag SFTMODE to positive unity in a step S42 which is a value to command a N/DL range change-over control and terminates the subroutine.

When the selection range RNG is indicating neither the neutral travel range (N) nor the forward travel range (DL), it denotes that the selection range is reverse range (R). In this case, the controller 80 sets the drive mode flag SFTMODE to negative unity in a step S43 and terminates the subroutine.

In the step S44, a transient value INVIVTRATIO0 of an inverse of the IVT speed ratio, a target pressure DSRPRSLC of the solenoid valve 91 for engaging the power recirculation clutch 9 and a target pressure DSRPRSHC of the solenoid valve 92 for engaging the direct connecting clutch 10 are respectively set to zero. A transient target CVT speed ratio RATIO0 is set equal to GNPRATIO. By this setting, in the neutral range (N), the power recirculation clutch 9 as well as the direct connecting clutch 10 are disengaged. GNPRATIO is a CVT speed ratio corresponding to the geared neutral point GNP. When the transient value INVIVTRATIO0 of the inverse of the IVT speed ratio is zero, the transient target IVT speed ratio is infinite.

In a next step S45, a torque shift compensation amount TSRTOMFL is reset to zero.

In a next step S46, a CVT speed ratio feedback control amount GFBRTO based on the vehicle acceleration and an integral part GIntgR thereof are respectively set to zero and the controller 80 terminates the subroutine.

In the step S44 through the step S46, the reason that all the parameters other than RATIO0 are set to zero, is that, in the neutral range (N), the power recirculation clutch 9 as well as direct connecting clutch 10 are disengaged and, since the CVT 2 does not transmit torque, the torque shift compensation is not required.

Next, referring to FIG. 8, a subroutine for N/DL range change-over control will be explained. The N/DL range change-over control denotes the change-over control of the IVT from the neutral range (N) to the forward travel range (DL).

At first, in a step S50, the controller 80 determines if the present selection range RNG of the range selector lever is indicating the neutral range (N).

If the selection range RNG is indicating the neutral range (N), it means that the range selector lever shifted again to the neutral range (N) after the last occasion of the subroutine execution, in which the change-over to the forward travel range (DL) from the neutral range (N) was detected.

In this case, in a step S51, an increment INTGND in the hydraulic pressure supplied by the solenoid vale 91 and a timer value NDTIMER are respectively reset to zero, and the drive mode flag SFTMODE is set to two which is a value to command DL/N change-over. After the processing of the step S51, the controller 80 terminates the subroutine.

In the step S50, if the present selection range RNG of the selector lever is not indicating the neutral range (N), the subroutine proceeds to a step S52.

In the step S52, the IVT speed ratio is maintained at the geared neutral point (GNP) by resetting the transient value INVIVTRATIO0 of the inverse of the IVT speed ratio to zero and setting the transient target CVT speed ratio RATIO0 to the speed ratio GNPRATIO corresponding to the geared neutral point.

In a next step S53, the torque shift compensation amount TSRTOMFL is reset to zero. This is because the CVT 2 does not transmit torque at the geared neutral point (GNP).

In a step S54 through a step S64, the power recirculation clutch 9 which has been disengaged is brought into an engaged state.

At first, in the step S54, the timer value NDTIMER is compared with a first predetermined value TND1. If the timer value NDTIMER is smaller than the first predetermined value TND1, the subroutine proceeds to the step S58. The initial value of the timer value NDTIMER is zero. Therefore, when the processing of the step S54 is executed for the first time, the timer value NDTIMER is necessarily zero, so the subroutine proceeds to the step S58 from the step S54.

In the step S58, the target pressure DSRPRSLC of the solenoid valve 91 for engaging the power recirculation clutch 9 is set to the first pre-charge pressure PND1.

When the processing of the step S58 is complete, the controller 80 adds unity to the timer value NDTIMER in the step S63, and terminates the subroutine.

In the step S54, if the timer value NDTIMER is not smaller than the first predetermined value TND1, the subroutine proceeds to the step S55. Here, the timer value NDTIMER is compared with a second predetermined value TND2. If the timer value NDTIMER is smaller than the second predetermined value TND2, the subroutine proceeds to the step S59.

In the step S59, the target pressure DSRPRSLC of the solenoid valve 91 is set to a second pre-charge pressure PND2. The second pre-charge pressure PND2 is set to be a value which is larger than the first pre-charge pressure PND1. After the processing of the step S59, the controller 80 adds unity to the timer value NDTIMER in the step S63, and terminates the subroutine.

In the step S55, if the timer value NDTIMER is not smaller than the second predetermined value TND2, the subroutine proceeds to the step S56. Here, the timer value NDTIMER is compared with a third predetermined value TND3. If the timer value NDTIMER is smaller than the third predetermined value TND3, the subroutine proceeds to the step S60.

In the step S60, at first, increment INTGND in the hydraulic pressure supplied by the solenoid valve 91 is calculated by the following equation (1).

$$INTGND = INTGND_{-1} + DELTAGND \quad (1)$$

where, $INTGND_{-1}$=the previous value of INTGND, the initial value of $INTGND_{-1}$ being zero, and DELTAGND=a constant.

In the next step S61, the target pressure DSRPRSLC of the solenoid valve 91 is set to a value which is obtained by adding the increment INTGND to the second pre-charge pressure PND2. Therefore, the target pressure DSRPRSLC increases on every occasion when the steps 60, 61 are executed. After the processing of the step 61 the controller 80 adds unity to the timer value NDTIMER in the step S63 and terminates the subroutine.

In the step S56, if the timer value NDTIMER is not smaller than the third predetermined value TND3, the subroutine proceeds to the step S57. Here, the timer value NDTIMER is compared with a fourth predetermined value TND4. If the timer value NDTIMER is smaller than the fourth predetermined value TND4, the subroutine proceeds to the step S62.

In the step S62, the target pressure DSRPRSLC of the solenoid valve 91 is set to a maximum value which is a pressure when the power recirculation clutch 9 is fully engaged. After the processing of the step S62, the controller 80 adds unity to the timer value NDTIMER in the step S63, and terminates the subroutine.

In the step S57, if the timer value NDTIMER is not smaller than the fourth predetermined value TND4, the controller 80 resets the increment INTGND and the timer value NDTIMER to zero and sets the drive mode flag SFTMODE to three which is a value to command creep torque control in the power recirculation mode in the step S64, and terminates the subroutine.

The fourth predetermined value TND4 is larger than the third predetermined value TND3, which is larger than the second predetermined value TND2, which is larger than the first predetermined value TND1.

Thus, the subroutine expends a time period corresponding to the fourth predetermined value TND4 in engaging the power recirculation clutch 9.

Next, referring to FIG. 9, a subroutine for DL/N change-over control will be explained. The DL/N change-over control denotes the change-over control of the IVT from the forward travel range (DL) to the neutral range (N).

At first, in a step S70, the controller 80 determines if the present selection range RNG of the range selector lever is indicating the forward travel range (DL), i.e., the drive range (D) or the low range (L). When the selection range RNG is indicating the forward travel range (DL), it means that the range selector lever shifted again to the forward travel range (DL) after the last occasion of the subroutine execution, in which the change-over to the neutral range (N) from the forward travel range (DL) was detected. In this case, in a step S71, the increment INTGND in the hydraulic pressure supplied by the solenoid valve 91 and the timer value DNTIMER are respectively reset to zero, the drive mode flag SFTMODE is set to unity which is a value to command N/DL change-over, and the controller 80 terminates the subroutine.

In the step S70, if the present selection range RNG of the range selector lever is not indicating the forward travel range (DL), the subroutine proceeds to a step S72.

In the step S72, the transient value INVIVTRATIO0 of the inverse of the IVT speed ratio is reset to zero, the transient target CVT speed ratio RATIO0 is set equal to GNPRATIO corresponding to the geared neutral point, and the target pressure DSRPRSLC of the solenoid valve 91 for the power recirculation clutch 9 is set to zero.

In a next step S73, the controller 80 resets the torque shift compensation amount TSRTOMFL to zero.

In a next step S74 through a step S80, the power recirculation clutch 9 which has been engaged is brought into a disengaged state.

First in the step S74, a timer value DNTIMER is compared with the first predetermined value TDN1. If the timer value DNTIMER is smaller than the TDN1, the subroutine proceeds to the step S76. The initial value of the timer value DNTIMER is zero. Therefore, when the processing of the step S74 is executed for the first time, the timer value DNTIMER is necessarily zero, so the subroutine proceeds to the step S76 from the step S74.

In the step S76, at first, a decrement INTGDN in the hydraulic pressure supplied by the solenoid valve 91 is calculated by the following equation (2).

$$INTGDN = INTGDN_{-1} + DELTAGDN \quad (2)$$

where, $INTGDN_{-1}$=the previous value of INTGDN, the initial value of INTGDN being zero, and DELTAGDN=a negative constant.

The decrement INTGDN is expressed as a negative value.

In the next step S77, the target pressure DSRPRSLC of the solenoid valve 91 is set to a value which is obtained by adding the decrement INTGDN to a first predetermined value PDN1. As understood from the above equation, since the decrement INTGDN is a negative value, the target pressure DSRPRSLC decreases on every occasion when the steps S76, S77 are executed. After the processing of the step S76, the controller 80 adds unity to the timer value DNTIMER in the step S79, and terminates the subroutine.

In the step S74, if the timer value DNTIMER is not smaller than the first determined value TDN1, the subroutine proceeds to the step S75. Here, the timer value DNTIMER is compared with a second predetermined value TDN2. If the timer value DNTIMER is smaller than the second predetermined value TDN2, the subroutine proceeds to the step S78.

In the step S78, the target pressure DSRPRSLC of the solenoid valve 91 is set to zero. After the processing of the step S78, the controller 80 adds unity to the timer value DNTIMER in the step S79, and terminates the subroutine.

In the step S75, if the timer value DNTIMER is not smaller than the second predetermined value TDN2, the controller 80 resets the decrement INTGDN and the timer value DNTIMER to zero and sets the drive mode flag SFTMODE to zero which is a value to command the speed ratio control in the Neutral range (N) in the step S80, and terminates the subroutine.

Next, referring to FIG. 10, a subroutine for creep torque control in the DL range in the power recirculation mode will be explained.

First, in a step S90, the controller 80 determines if the present selection range RNG of the range selector lever is indicating the neutral range (N).

If the selection range RNG is indicating the neutral range (N), it means that the range selector lever shifted again to the neutral range (N) after the last occasion of the subroutine execution, in which the vehicle running condition was determined to be in the creep torque control region. In this case, in a step S91, the controller 80 sets the drive mode flag SFTMODE to two which is a value to command the DL/N range change-over control. After the processing of the step S91, the controller 80 terminates the subroutine.

In the step S90, when the selection range RNG of the selector lever is not indicating the neutral range (N), the subroutine proceeds to a step S92.

In the step S92, it is determined if the conditions that the accelerator pedal depression amount APS is smaller than a predetermined value APS#1, and that the idle signal IDLE is ON, are both satisfied. If either condition is not satisfied, the controller 80 sets the drive mode flag SFTMODE to four which is a value to command the normal control in the DL range in the power recirculation mode in a step S94, and terminates the subroutine.

In the step S92, if the accelerator pedal depression amount APS is smaller than the predetermined amount APS#1 and the idle signal IDLE is ON, the subroutine proceeds to a step S93. Here, the vehicle speed VSP is compared with a predetermined vehicle speed VSP#1. Herein, the predetermined vehicle speed VSP#1 is set equal to five kilometers per hour (5 km/hr).

If the vehicle speed VSP is not smaller than the predetermined vehicle speed VSP#1, in the step S94, the controller 80 sets the drive mode flag SFTMODE to four and terminates the subroutine as described above. On the other hand, if the vehicle speed VSP is smaller than the predetermined vehicle speed VSP#1, the controller 80 executes the control of creep torque in a step S95 through a step S107.

Figure 11:
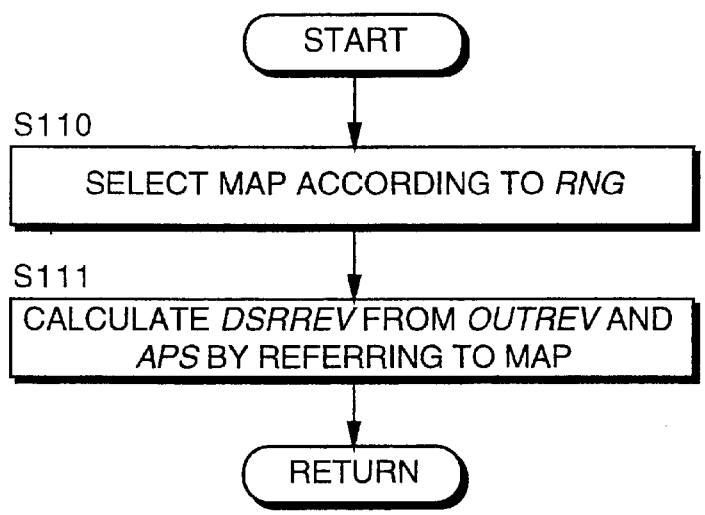
FIG. 11 is a flowchart describing a subroutine executed by the controller for calculating a target input shaft rotation speed.

First, in the step S95, a subroutine shown in FIG. 11 is executed to calculate a final target input shaft rotation speed DSRREV.

Figure 12:
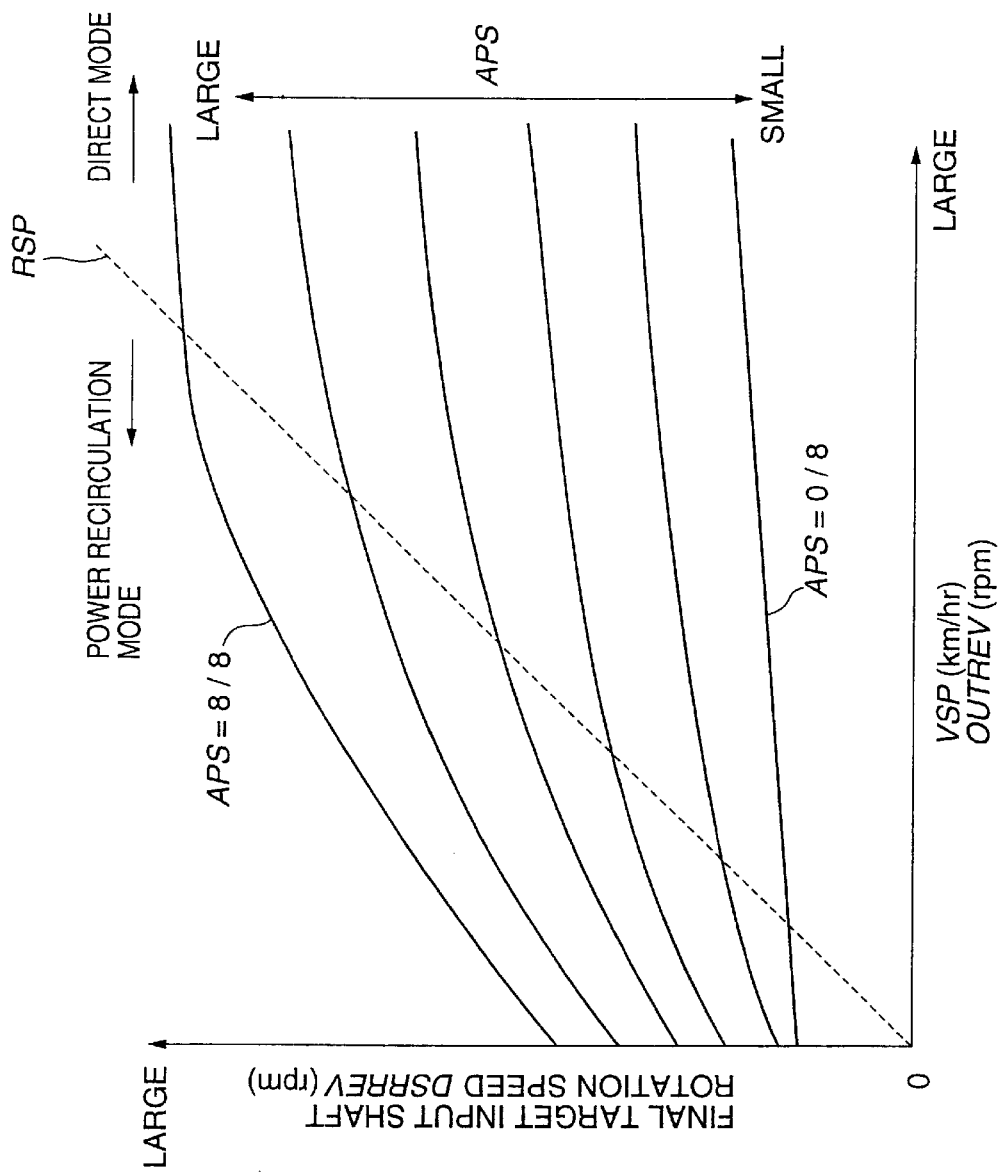
FIG. 12 is a diagram showing the characteristics of a speed ratio map in the drive range stored by the controller.

Referring to FIG. 11, the controller 80, first determines if the selection range RNG of the range selector lever is indicating the drive range (D) or the low range (L) in a step S110, and selects a map according to the selection range from a plurality of speed ratio maps prestored in the memory of the controller 8. The characteristics of the map for the drive range (d) is shown in FIG. 12.

In a next step S111, referring to the selected map, the controller 80 obtains the target input shaft rotation speed DSRREV based on the rotation speed OUTREV and the accelerator pedal depression amount APS.

Figure 13:
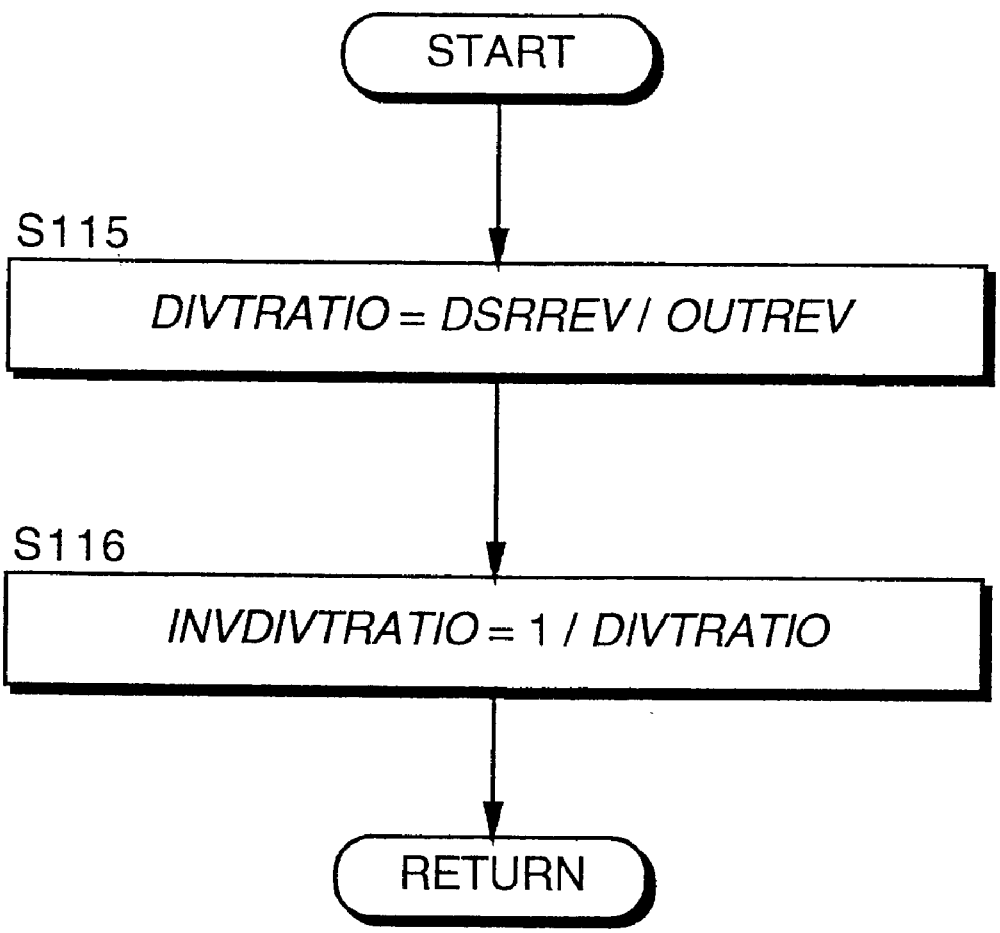
FIG. 13 is a flowchart describing a subroutine executed by the controller for calculating a final target IVT speed ratio.

Referring to FIG. 10 again, after calculating the target input shaft rotation speed DSRREV in the step S95, the controller 80 calculates an inverse INVDIVTRATIO of the final target IVT speed ratio by execution of a subroutine shown in FIG. 13 in a step S96.

Referring to FIG. 13, this subroutine will be explained.

First in a step S115, the final target input shaft rotation speed DSRREV is divided by the rotation speed OUTREV of output shaft 6 to calculate the final target IVT speed ratio DIVTRATIO.

In a next step S116, the inverse INVDIVTRATIO of the final target IVT speed ratio DIVTRATIO is calculated.

Figure 14:
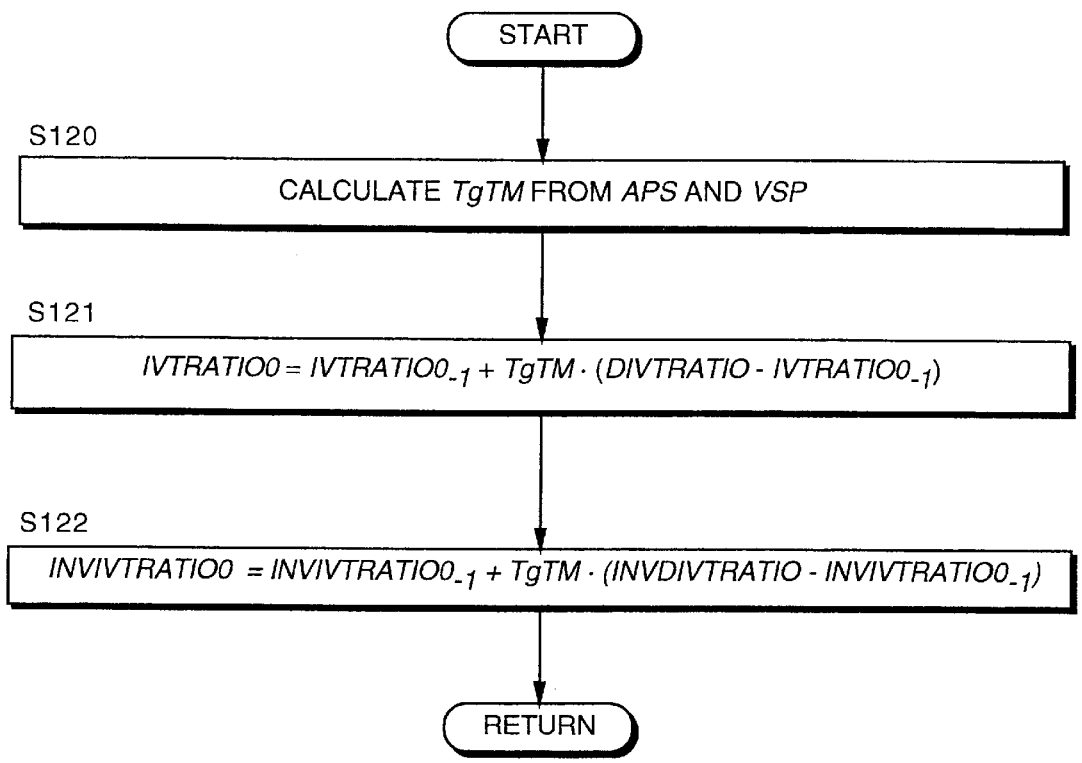
FIG. 14 is a flowchart describing a subroutine executed by the controller for calculating a transient target IVT speed ratio.

Referring to FIG. 10 again, after calculating the inverse INVDIVTRATIO of the final target IVT speed ratio in the step S96, the controller 80 calculates the transient value INVIVTRATIO0 of the inverse of the transient target IVT speed ratio by execution of the subroutine shown in FIG. 14 in a next step S97.

Referring to FIG. 14, this subroutine will be explained.

First, in a step S120, the controller 80 calculates a time constant TgTM showing characteristics of a change in speed ratio in a transient state of IVT based on the accelerator pedal depression amount APS and vehicle speed VSP.

In a next step S121, the controller calculates a transient target IVT speed ratio IVTRATIO0 from the final target IVT speed ratio DIVTRATIO and the time constant TgTM by the following equation (3).

$$IVTRATIO0 = IVTRATIO0_{-1} + TgTM \cdot (DIVTRATIO - IVTRATIO0_{-1}) \quad (3)$$

where,

IVTRATIO0$_{-1}$ the previous value of IVTRATIO0.

In a next step S122, the transient value INVIVTRATIO0 of the inverse of the transient target IVT speed ratio is calculated by the following equation (4).

$$INVIVTRATIO0 = INVIVTRATIO0_{-1} + TgTM \cdot (INVDIVTRATIO - INVIVTRATIO0_{-1}) \quad (4)$$

where,

INVIVTRATIO0$_{-1}$ = the previous value of INVIVTRATIO0.

The equations (3) and (4) correspond to a general low pass filter with a first order delay to set a target value in a transient state. It is also possible to replace the filter by that with the second order delay depending on the purpose of IVT control.

Referring again to FIG. 10, after executing the above subroutine, in a next step S98, the controller 80 calculates the transient target CVT speed ratio RATIO0 with reference to a map having the characteristics shown in FIG. 3 based on the transient value INVIVTRATIO0 of the inverse of the transient target IVT speed ratio. The map is previously stored in the memory of the controller 80. The transient target CVT speed ratio RATIO0 corresponds to a target speed ratio defined in the Claims.

Figure 15:
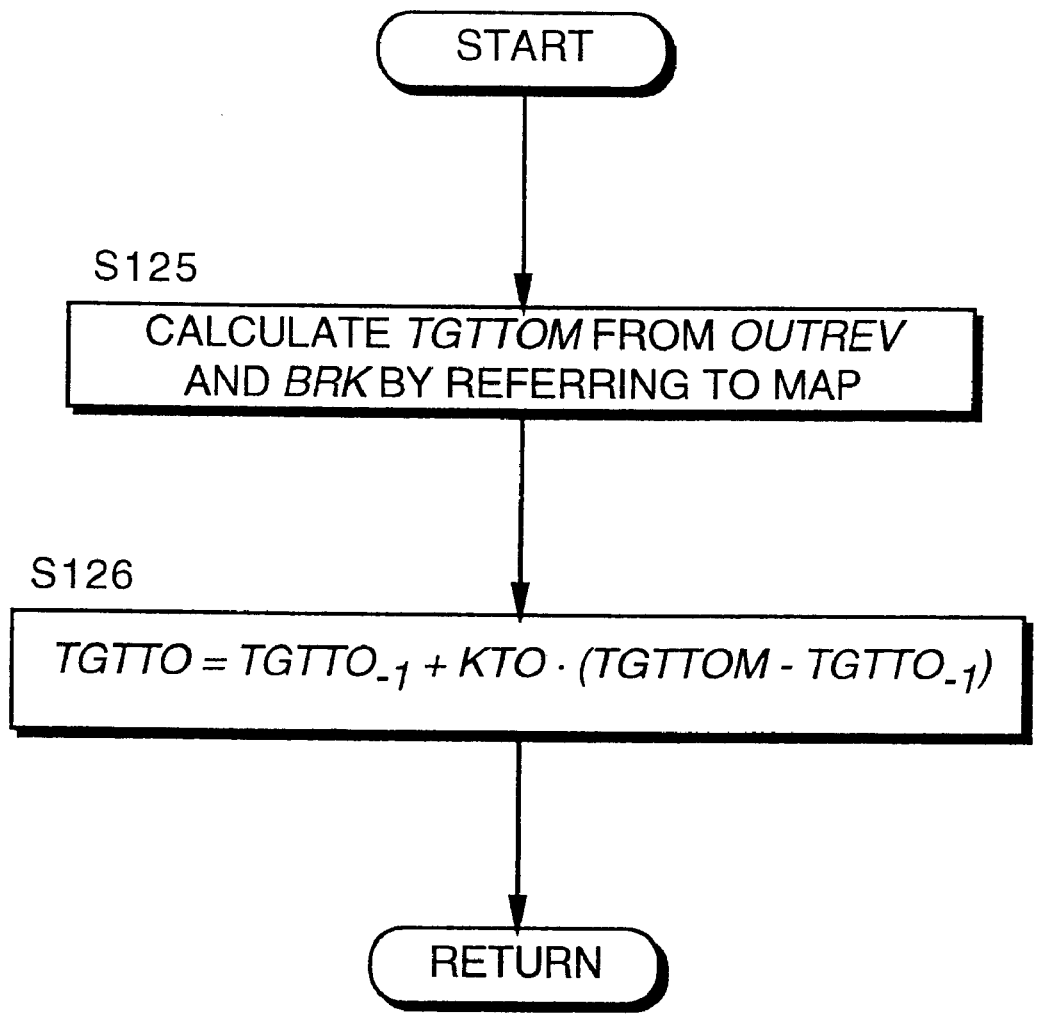
FIG. 15 is a flowchart describing a subroutine executed by the controller for calculating a target output torque of the IVT.

In a next step S99, the controller 80 calculates a creep torque by executing a subroutine shown in FIG. 15.

Figure 16:
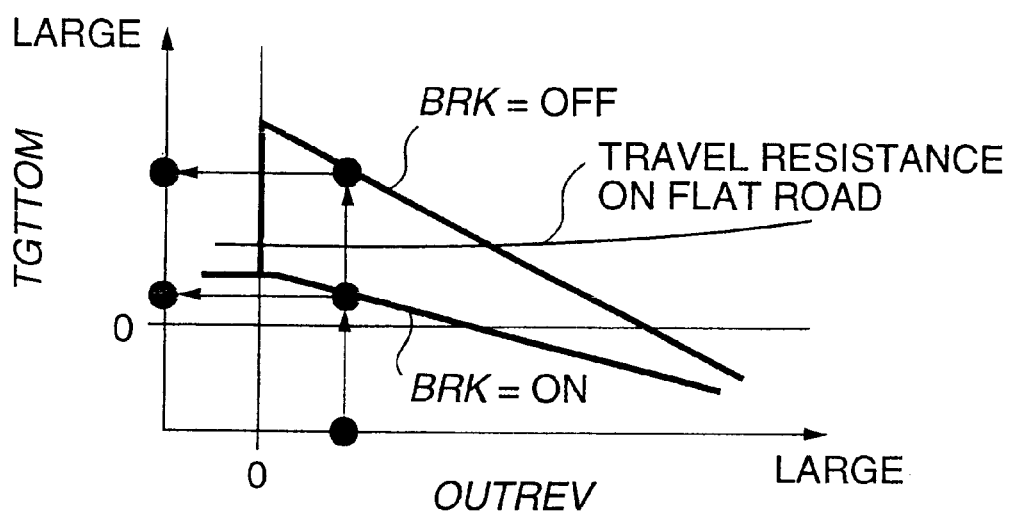
FIG. 16 is a diagram showing the characteristics of a map of target output torque stored by the controller.

Referring to FIG. 15, in a first step S125, the controller 80 obtains a basic value TGTTOM of IVT target output torque with reference to a map having the characteristics shown in FIG. 16 based on the rotation speed OUTREV of the output shaft 6 and the brake signal BRK. The map is previously stored in the memory of the controller 80.

According to this map, the basic value TGTTOM of IVT target output torque increases as the rotation speed OUTREV of the output shaft 6 decreases. Specifically, when the brake switch 86 is OFF, the vehicle accelerates by the output torque of IVT when it is larger than a torque equivalent to the travel resistance. The torque equivalent to the travel resistance on a flat road is shown by a thin line in FIG. 15 and in the range where the output torque of IVT surpasses this line, the vehicle accelerates. The basic value TGTTOM of IVT target output torque when the brake switch is ON is always under this line regardless of the rotation speed OUTREV of the output shaft 6.

It means that as long as the brake switch 86 is ON during traveling on a flat road, the IVT exerts torque in a decelerating direction on the vehicle.

In a next step S126, the controller 80 calculates an IVT target output torque TGTTO by the following equation (5) which also corresponds to a low pass filter.

$$TGTTO = TGTTO_{-1} + KTO \cdot (TGTTOM - TGTTO_{-1}) \quad (5)$$

where,

TGTTO$_{-1}$ = the previous value of TGTTO, and

KTO = a time constant.

Due to the above processing, even when the brake is repeatedly operated, the IVT target outputting torque TGTTO is prevented from fluctuating. Therefore, this processing helps to stabilize the feedback control of the output torque of IVT.

Referring again to FIG. 10, after calculating the IVT target output torque TGTTO in the step S99, the controller 80 calculates the target vehicle acceleration TGTGDATA in a next step S100 based on the IVT target output torque TGTTO by the following equation (6).

$$TGTGDATA = (TGTTO - TORL) \cdot KCONV \quad (6)$$

where,

TORL = a travel resistance of the vehicle including energy loss due to wind and resistance by gradient, and KCONV = a conversion factor depending on vehicle weight, tire diameter, etc.

Next, in a step S101, the controller 80 compares the vehicle speed VSP with a predetermined vehicle speed VSP#2. The predetermined vehicle speed VSP#2 is set to a value between one kilometer per hour (1 km/hr) and two kilometers per hour (2 km/hr). If the vehicle speed VSP is not larger than the predetermined vehicle speed VSP#2, the controller 80 determines if the brake signal BRK is ON in a step S102. If the brake signal BRK is ON, the controller 80 regards that the vehicle is at rest and executes a process of a step S104.

Specifically, the transient value INVIVTRATIO0 of the inverse of the transient target IVT speed ratio is reset to zero, the transient target CVT speed ratio RATIO0 is reset to GNPRATIO corresponding to GNP. Further, a CVT speed ratio feedback correction amount GFBRTO and an integral part GIntgR thereof are respectively reset to zero. After this processing, the subroutine proceeds to a step S105.

On the other hand, if the real vehicle speed VSP is larger than the predetermined vehicle speed VSP#2 in the step S101, or if the brake signal BRK is OFF in the step S102, the vehicle is determined to be traveling by the creep torque. In this case, the controller 80 calculates the CVT speed ratio feedback correction amount GFBRTO and the integral part GIntgR thereof by executing the subroutine shown in FIG. 17 in a step S103.

Figure 17:
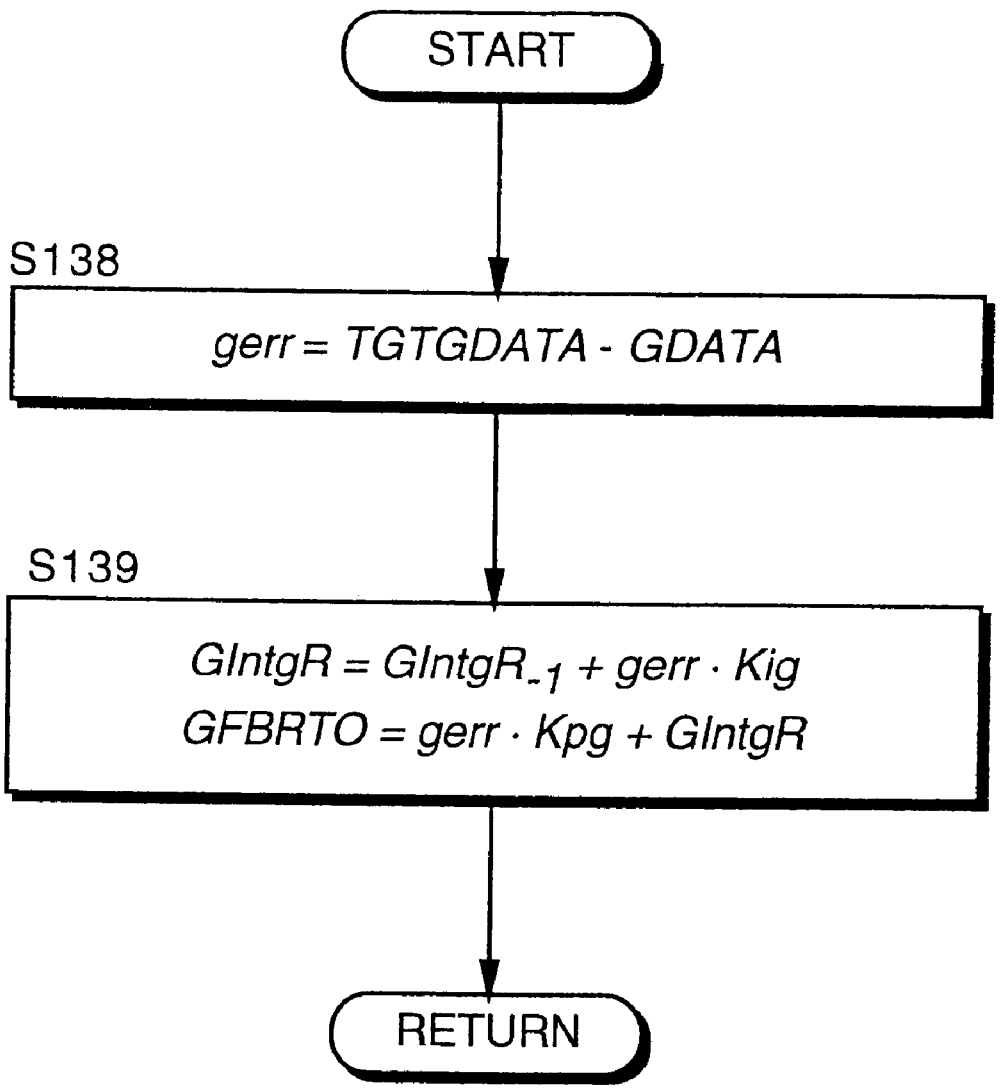
FIG. 17 is a flowchart describing a subroutine executed by the controller for calculating a CVT speed ratio feedback correction amount GFBRTO and an integral part GIntgR thereof according to the vehicle acceleration.

Referring to FIG. 17, in a first step S138, the controller calculates an acceleration deviation gerr from the real vehicle acceleration GDATA calculated in the step S2 and the target vehicle acceleration TGTGDATA calculated in the step S100 by the following equation (7).

$$gerr = TGTGDATA - GDATA \quad (7)$$

In a next step S139, the integral part GIntgR of the CVT speed ratio feedback correction amount is calculated by the following equation (8), and the CVT speed ratio feedback correction amount GFBRTO based on the acceleration deviation gerr is calculated by the following equation (9) respectively.

$$GIntgR = GIntgR_{-1} + gerr \cdot Kig \quad (8)$$

where,

GIntgR$_{-1}$ = the previous value of GIntgR, and

Kig = an integral gain.

$$GFBRTO = gerr \cdot Kpg + GIntgR \quad (9)$$

where,

Kpg = a proportional gain.

The equations (8) and (9) are known equations for proportional/integral control (PI control). As can be understood from the equations, the greater the acceleration deviation gerr, the larger the feedback correction amount GFBRTO.

After calculating the CVT speed ratio feedback correction amount GFBRTO in the step S103 or S104 of the subroutine in FIG. 10, the controller 80 executes the processing of a step S105.

Figure 18A:
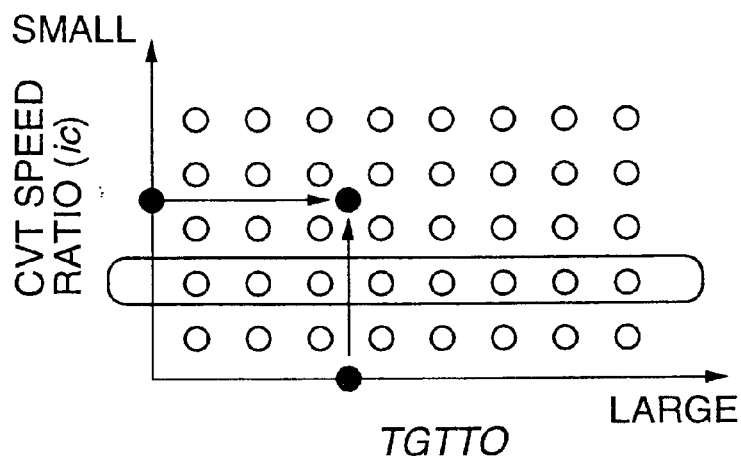
FIGS. 18A and 18B are diagrams showing the characteristics of a map of a torque shift compensation amount basic value CRPRTOM stored by the controller.

In the step S105, the controller 80 calculates a torque shift compensation amount basic value CRPRTOM of CVT speed ratio during the creep torque control with reference to a map having the characteristics shown in FIG. 18A. This map is also previously stored in the memory of the controller 80. This map is a three dimensional map depending on the target output torque TGTTO and CVT speed ratio ic as parameters.

According to this map, the ratio of input torque and output torque of the CVT 2 is determined based on the CVT speed ratio ic. The control of creep torque is generally performed when the IVT speed ratio ii is in the vicinity of the geared neutral point (GNP). In other words, the control zone of creep torque is limited to the case where the CVT speed ratio ic resides in the vicinity of the geared neutral point (GNP) in FIG. 3.

Figure 18B:
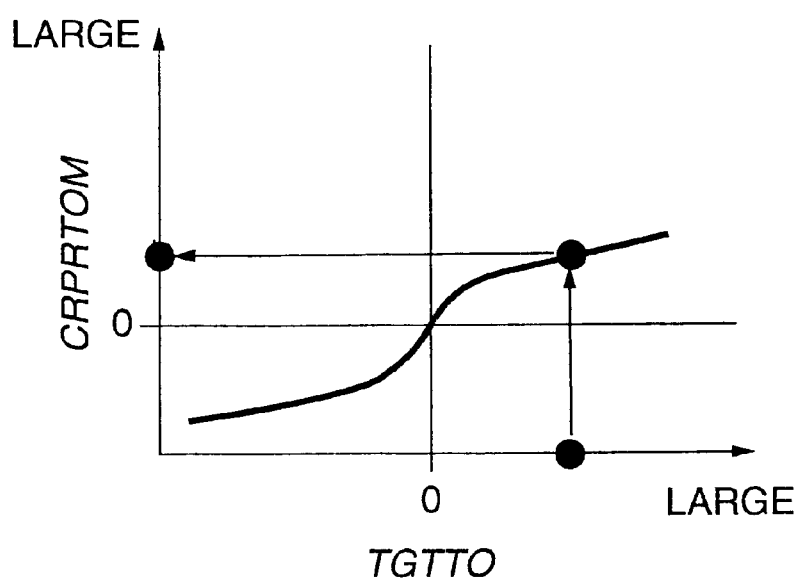

Since the CVT speed ratio ic during the creep torque control may be considered to have a fixed value, it is also possible to determine the torque shift compensation amount basic value CRPRTOM with reference to a map which depends only on the target output torque TGTTO as shown in FIG. 18B instead of using the three dimensional map of FIG. 18A.

In a next step S106, the controller 80 calculates a torque shift compensation amount TSRTOMFL by the following equation (10) based on the torque shift compensation amount basic value CRPRTOM.

$$TSRTOMFL = TSRTOMFL_{-1} + KTS \cdot (CRPRTOM - TSRTOMFL_{-1}) \quad (10)$$

where, $TSRTOMFL_{-1}$=the previous value of TSRTOMFL, and

KTS=a time constant.

The equation (10) also corresponds to a low pass filter.

In a next step S107, the controller 80 sets the target pressure DSRPRSHC of the solenoid valve 92 to zero in order to disengage the direct connecting clutch 10, while setting the target pressure DSRPRSLC of the solenoid valve 91 to a maximum value in order to connect the power recirculation mode clutch 9. After the processing of the step S107, the controller 80 terminates the subroutine.

By executing the subroutine of FIG. 10, the speed ratio ic of the CVT 2 is determined depending on the speed ratio map of IVT, the feedback correction amount based on the vehicle acceleration and the torque shift compensation amount. In actuality, a further correction, which is described later, is applied to compensate the response delay of the step motor 36.

Next, referring to FIG. 19, a subroutine for the normal control of the speed ratio in the DL range in the power recirculation mode will be explained.

First in a step S150, the controller 80 determines if the following three conditions are simultaneously satisfied. The conditions are that the accelerator pedal depression amount APS is not greater than the value of (a predetermined amount APS#1-α), the idle signal IDLE is ON, and the vehicle speed VSP is not greater than the value of (a predetermined vehicle speed VSP#1-β. If all of these conditions are satisfied, the subroutine proceeds to a step S151.

If these three conditions are satisfied, the controller 80 considers that the creep torque control conditions are satisfied. In this case, in order to execute the creep torque control in the next occasion when the main routine is executed, the controller 80 sets the drive mode flag SFTMODE equal to three in a step S151, which is the value to command the creep torque control. Further, in a next step S152, the controller 80 sets the CVT speed ratio feedback correction amount GFBRTO and the integral part GIntgR thereof to be equal to zero. After the processing of the step S152, the subroutine is terminated.

The determination in the step S150 is performed in the opposite way to the determination performed in the steps S92 and S93 of the subroutine of FIG. 10 for determining if the creep torque control conditions are satisfied.

If on the other hand any of the three conditions is not satisfied in the step 150, the controller 80 considers that the creep torque control conditions are not satisfied. In this case, the subroutine proceeds to a step S153, and executes normal speed ratio control in the drive range (D) or low range (L). After the processing of the step S153, the subroutine is terminated.

The normal speed ratio control is summarized as follows.

Referring to the map of FIG. 11, the final target input shaft rotation speed DSRREV is determined from the vehicle speed VSP and accelerator pedal depression amount APS. The final target IVT speed ratio DIVTRATIO is calculated from the final target input shaft rotation speed DSRREV and the vehicle speed VSP, and the transient target IVT speed ratio IVTRATIO0 is calculated based on the final target IVT speed ratio DIVTRATIO. Then, based on the transient target IVT speed ratio IVTRATIO0, the transient target CVT speed ratio RATIO0 is obtained from the map of FIG. 3. The step number corresponding to the transient target CVT speed ratio RATIO0 is then output to the step motor 36. This normal speed, ratio control process of IVT is known by U.S. Pat. No. 6,174,261.

In parallel with the speed ratio control, the hydraulic pressure of the solenoid valves 91, 92 is controlled based on the real CVT speed ratio RATIO so as to selectively apply the power recirculation mode or the direct mode.

Now referring again to FIG. 5, the rest of the main routine will be described. After executing any of the processing of the step S9 through the step S14, the controller 80 calculates the command step number DSRSTP of the step motor 36 by executing a subroutine shown in FIG. 20 in a step S15.

Figure 20:
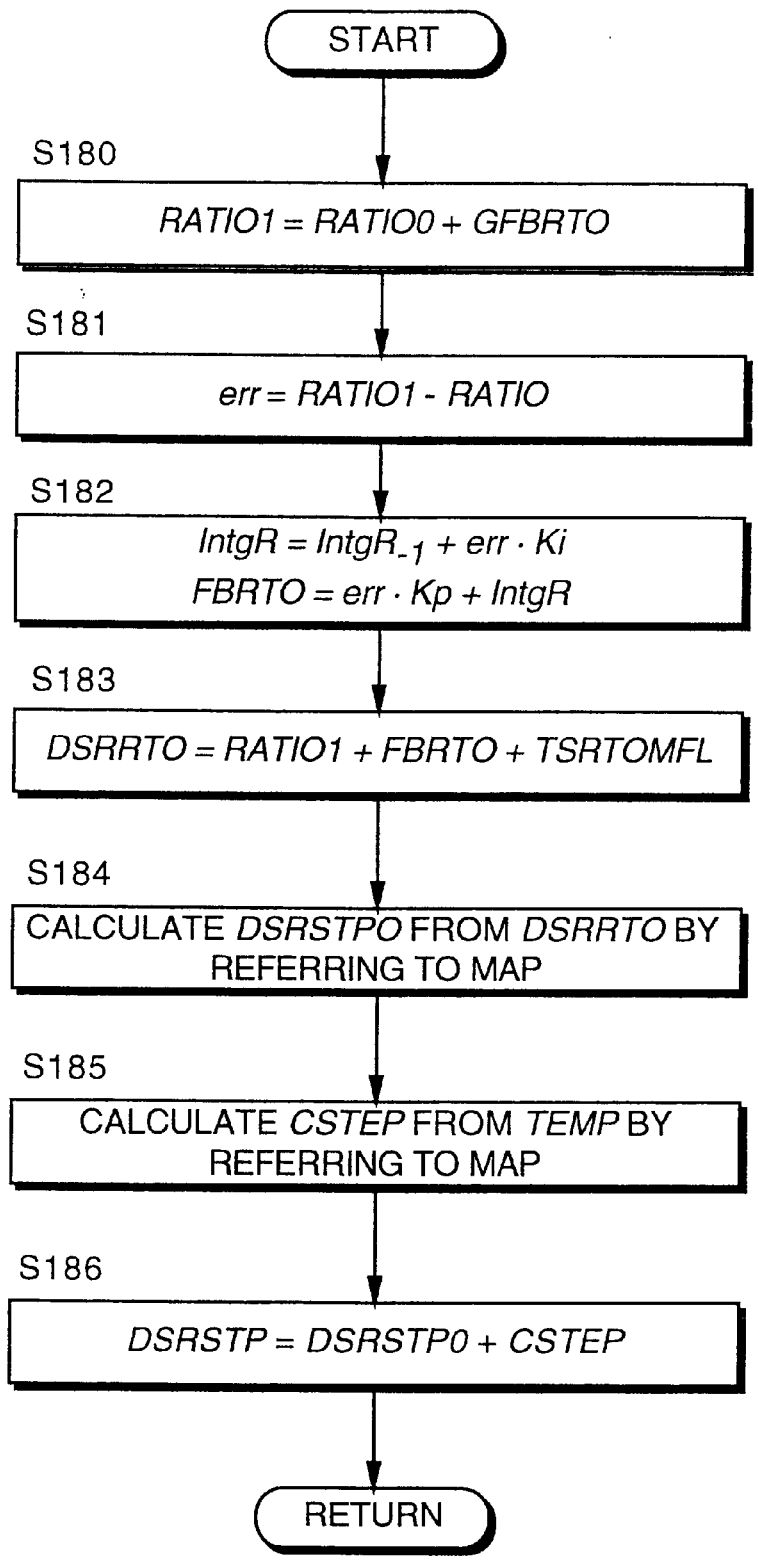
FIG. 20 is a flowchart describing a subroutine executed by the controller for calculating a command step number DSRSTP of the step motor.

Referring to FIG. 20, in a first step S180, the controller 80 calculates a corrected transient target CVT speed ratio RATIO1 by adding the CVT speed ratio feedback correction amount GFBRTO set in any of the subroutines corresponding to the step S9 through the step S14, to the transient target CVT speed ratio RATIO0 set in the same subroutine. The corrected transient target CVT speed ratio RATIO1 corresponds to a corrected target speed ratio defined in the Claims.

In a next step S181, a speed ratio deviation err is calculated from the corrected transient target CVT speed ratio RATIO1 and the real CVT speed ratio RATIO.

In a next step S182, a feedback correction amount FBRTO of CVT speed ratio based on the speed ratio deviation err is calculated by applying the following equations (11) and (12).

$$IntgR = IntgR_{-1} + err \cdot Ki \quad (11)$$

where,

IntgR=an integral part of the feedback correction amount, $IntgR_{-1}$=the previous value of IntgR, and Ki=an integral gain.

$$FBRTO = err \cdot Kp + IntgR \quad (12)$$

where,

Kp=a proportional gain.

The equations (11) and (12) correspond to proportional/integral control (PI control).

In a next step S183, by using the corrected transient target CVT speed ratio RATIO1, the feedback correction amount FBRTO of CVT speed ratio based on the speed ratio deviation err, and the torque shift compensation amount TSRTOMFL, a target CVT speed ratio command value DSRRTO is calculated by the following in equation (13).

$$DSRRTO = RATIO1 + FBRTO + TSRTOMFL \quad (13)$$

Figure 21:
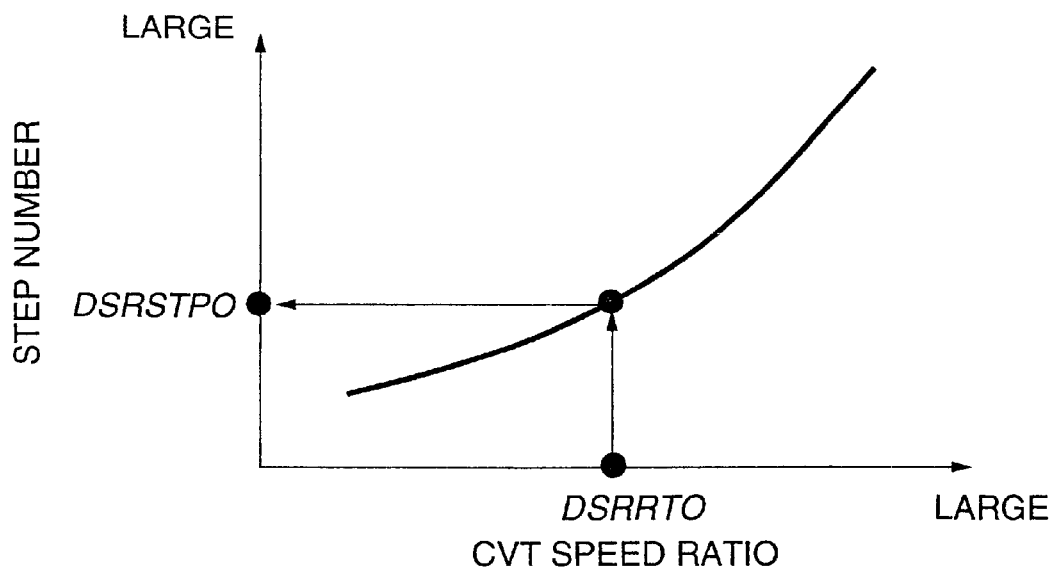
FIG. 21 is a diagram showing the characteristics of a map specifying the relation between a target CVT speed ratio command value DSRRTO and a target step number DSRSTP0 of the step motor.

In a next step S184, the controller 80 converts the target CVT speed ratio command value DSRRTO to the step number of the step motor 36 with reference to a map having the characteristics shown in FIG. 21.

The map is previously stored in the memory of the controller 80. This step number obtained in this way is referred to as a target step number DSRSTP0.

Figure 22:
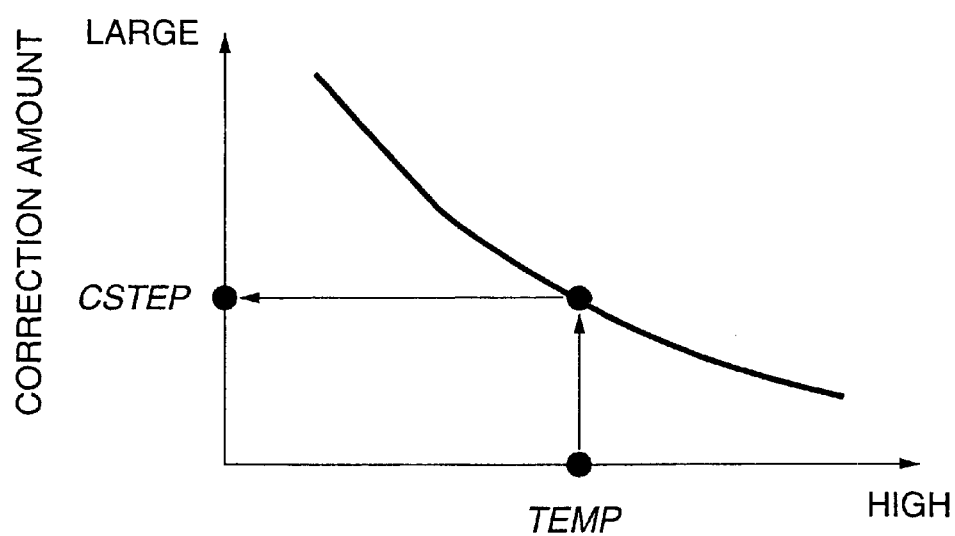
FIG. 22 is a diagram showing the characteristics of a map of an oil temperature correction amount CSTEP stored by the controller.

In a next step S185, the controller 80 obtains an oil temperature correction amount CSTEP based on the temperature TEMP that the oil temperature sensor 88 has detected, with reference to a map having the characteristics shown in FIG. 22.

The map is previously stored in the memory of the controller 80. The oil temperature correction amount CSTEP is a value to compensate the error which appears in the relation between the operating position of the step motor 36 and the speed ratio of the CVT 2 depending on the oil temperature in the CVT 2.

In a next step S186, a command step number DSRSTP is calculated by adding the oil temperature correction amount CSTEP to the target step number DSRSTP0.

Figure 23:
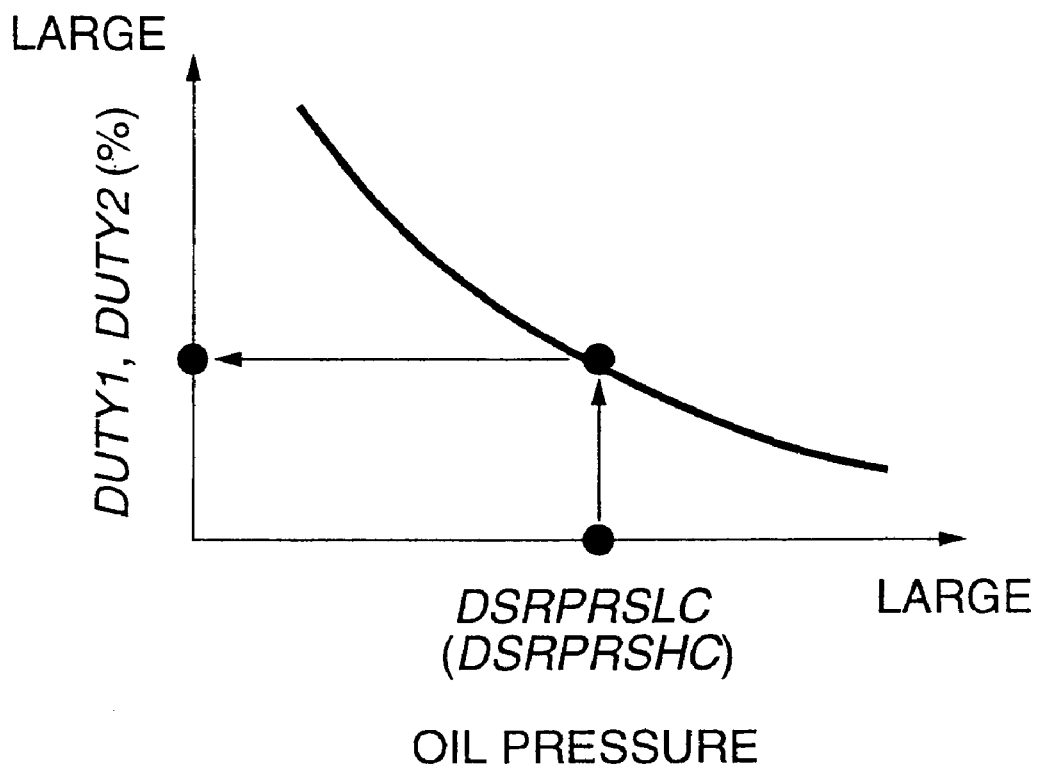
FIG. 23 is a diagram showing the characteristics of a map specifying a relation between a target oil pressure of a clutch and a duty ratio of a solenoid valve, stored by the controller.

Referring again to FIG. 5, after calculating the command step number DSRSTP in this way in the step S15, the controller 80 converts the target pressure DSRPRSLC and DSRPRSHC of the solenoid valves 91 and 92 to the duty signals DUTY1 and DUTY2 for the solenoid valves 91 and 92 in a next step S16 with reference to a map having the characteristics shown in FIG. 23. The map is previously stored in the memory of the controller 80. The target pressure DSRPRSLC and DSRPRSHC are values which were set in any of the subroutines corresponding to the steps S9 through the steps S14.

In a last step S17, the controller 80 outputs the command step number DSRSTP to the step motor 36, and outputs the duty signals DUTY1 and DUTY2 to the solenoid valves 91 and 92. After the processing of the step S17, the controller 80 terminates the main routine.

Next, referring to FIGS. 24A–24M, the variation in creep torque under the above creep torque control when the vehicle starts will be described.

At a time T0, as shown in FIG. 24A, the range selector lever is in the neutral range (N), and the accelerator pedal is not depressed as shown in FIG. 24B. In this state, the controller 80 disengages both of the power recirculation clutch 9 and direct connecting clutch 10 by executing the subroutine for N range in FIG. 7 in the step S9 of the main routine, and holds the CVT speed ratio of the CVT a to GNPRATIO corresponding to the geared neutral point GNP as shown in FIG. 24I. In this state, the output torque of the output shaft 6 is zero as shown in FIG. 24M. The drive mode flag SFTMODE is set equal to zero as shown in FIG. 24D.

Although the brake pedal is depressed and the brake signal BRK turns ON between the time T0 and T1, however, this state continues regardless of the brake signal BRK as long as the drive mode flag SFTMODE has a value of zero.

At the time T1, the driver shifts the range selector lever from the neutral range (N) to the drive range (D) as shown in FIG. 24A.

Accordingly, the controller 80 sets the drive mode flag to unity in the subroutine of FIG. 7. The controller 80 detects the change of the drive mode flag SFTMODE to unity in the step S5 of the main routine in the next occasion when the main routine is executed, and executes the subroutine for N/DL range change-over of FIG. 8 in the step S10 of the main routine. In the subroutine of FIG. 8, the controller 80 engages the power recirculation clutch 9 over the predetermined time TND4 as shown in FIG. 24E. The CVT speed ratio is still kept at GNPRATIO corresponding to the geared neutral point (GNP).

At a time T2, the power recirculation clutch 9 completely engages.

As a result, the drive mode flag SFTMODE is set to have a value of three in the step S64 of the subroutine for N/DL range change-over of FIG. 8. The controller 80 detects the change of the drive mode flag SFTMODE to three in the step S7 of the main routine in the next occasion when the main routine is executed, and executes the subroutine of FIG. 10 for the creep torque control in the DL range in the power recirculation mode in the step S12 of the main routine.

Since the brake signal is still ON, the CVT speed ratio set in the step S104 of FIG. 10 is still equal to GNPRATIO corresponding to the geared neutral point (GNP) as shown in FIG. 24I. Therefore, as shown in FIG. 24F, the command step number DSRSTP output to the step motor 36 has the GNP equivalent value. As the IVT speed ratio is kept at the geared neutral point GNP until the time T3 when the brake signal BRK changes to OFF, the CVT 2 transmits no torque.

Therefore, as shown in FIGS. 24G and 24H, the torque shift compensation amount TSRTOMFL as well as the CVT speed ratio feedback correction amount GFBRTO based on the acceleration deviation gerr are both zero. Further, as shown in FIG. 24J, the engine rotation speed Ne is held to the idle rotation speed. As shown in FIGS. 24K and 24L, the vehicle speed VSP as well as the vehicle acceleration GDATA are also zero. The torque output to the output shaft 6, i.e., the output torque of the IVT is also maintained at zero as shown in FIG. 24M.

When the brake signal BRK is changed to OFF at the time T3 the target output torque TGTTO calculated in the step S99 of the subroutine of FIG. 10 increases as shown in FIG. 24M. As a result, the target vehicle acceleration TGTGDATA calculated in the step S100 increases, and the CVT speed ratio feedback correction amount GFBRTO calculated in the step S139 of the subroutine of FIG. 17 also increases.

Hence, the target CVT speed ratio command value DSRRTO calculated in the step S183 of the subroutine of FIG. 20 starts to increase from GNPRATIO as shown in FIG. 24F as soon as the brake signal BRK changes from ON to OFF, and IVT starts to transmit torque to the output shaft 6.

In the calculation of the step number of the step motor 36, the CVT speed ratio feedback correction amount GFBRTO is added to the transient target CVT speed ratio RATIO0 to calculate the corrected transient target CVT speed ratio RATIO1. Further, the feedback correction amount FBRTO based on the speed ratio deviation err and the torque shift compensation amount TSRTOMFL are added to RATIO1 to calculate the target CVT speed ration command value DSRRTO. As a result, the target CVT speed ratio command value DSRRTO has a larger value than the transient target CVT speed ratio RATIO0.

The output torque of the IVT is zero when the rotation speed OUTREV of the output shaft 6 is zero, i.e., the CVT speed ratio is equal to GNPRATIO, but when the CVT speed ratio slightly increases from GNPRATIO, it abruptly increases and then gradually decreases as the CVT speed ratio increases further. These characteristics are apparent from the map of FIG. 5.

Correcting the CVT speed ratio in the increasing direction when the vehicle starts to move at the time T3 as described above, realizes smooth vehicle acceleration and smooth increase in the output torque of the output shaft 6.

At a time T4, as shown in FIG. 24K, when the vehicle speed reaches the predetermined value VSP#1, the controller 80 sets the drive mode flag SFTMODE to have a value of four in the step S94 of FIG. 10. This processing completes the creep torque control in the DL range in the power recirculation mode.

On the next occasion when the main routine of FIG. 5 is executed, the normal control subroutine in the DL range in the power recirculation mode of FIG. 19 is executed in the step S13.

The creep torque variation described above is an example when the vehicle starts. When on the other hand the driver depresses the brake pedal to decelerate the vehicle to stop, the target output torque TGTTO of the IVT calculated based on the map of FIG. 16A decreases to a value smaller than the travel resistance. Accordingly, the target acceleration TGTGDATA takes a negative value. Since the CVT speed ratio is feedback controlled according to the acceleration deviation gerr in order to achieve the negative target acceleration TGTGDATA, the vehicle decelerates as intended by the driver.

Next, referring to FIGS. 25–27, a second embodiment of this invention will be described.

According to the first embodiment, the CVT speed ratio was feedback controlled based on the acceleration deviation gerr of the target vehicle acceleration TGTGDATA with respect to the real vehicle acceleration GDATA. In this embodiment, the CVT speed ratio is corrected by open loop control based on the target vehicle acceleration TGTGDATA.

Figure 25:
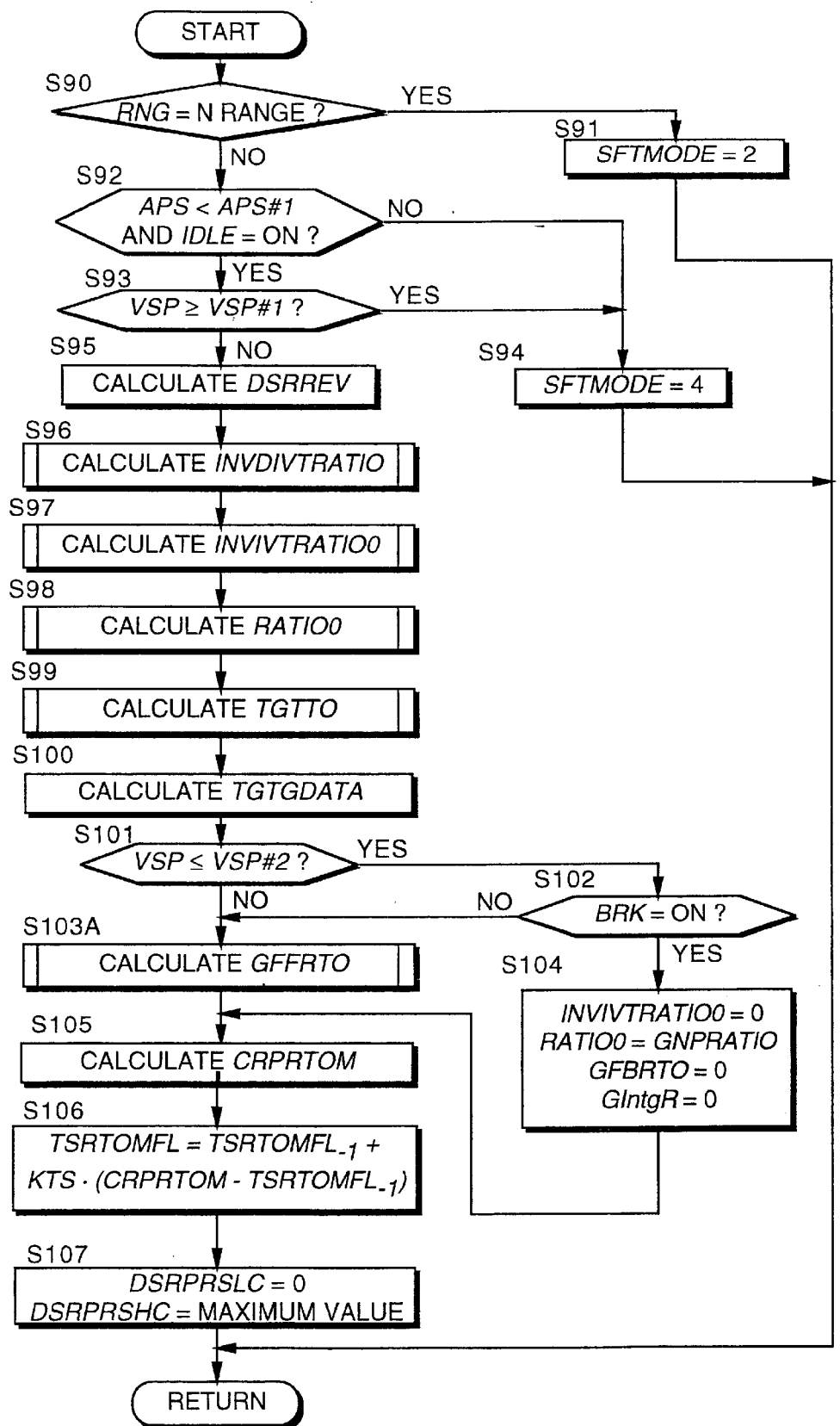
FIG. 25 is similar to FIG. 10, but showing a second embodiment of this invention.
Figure 26:
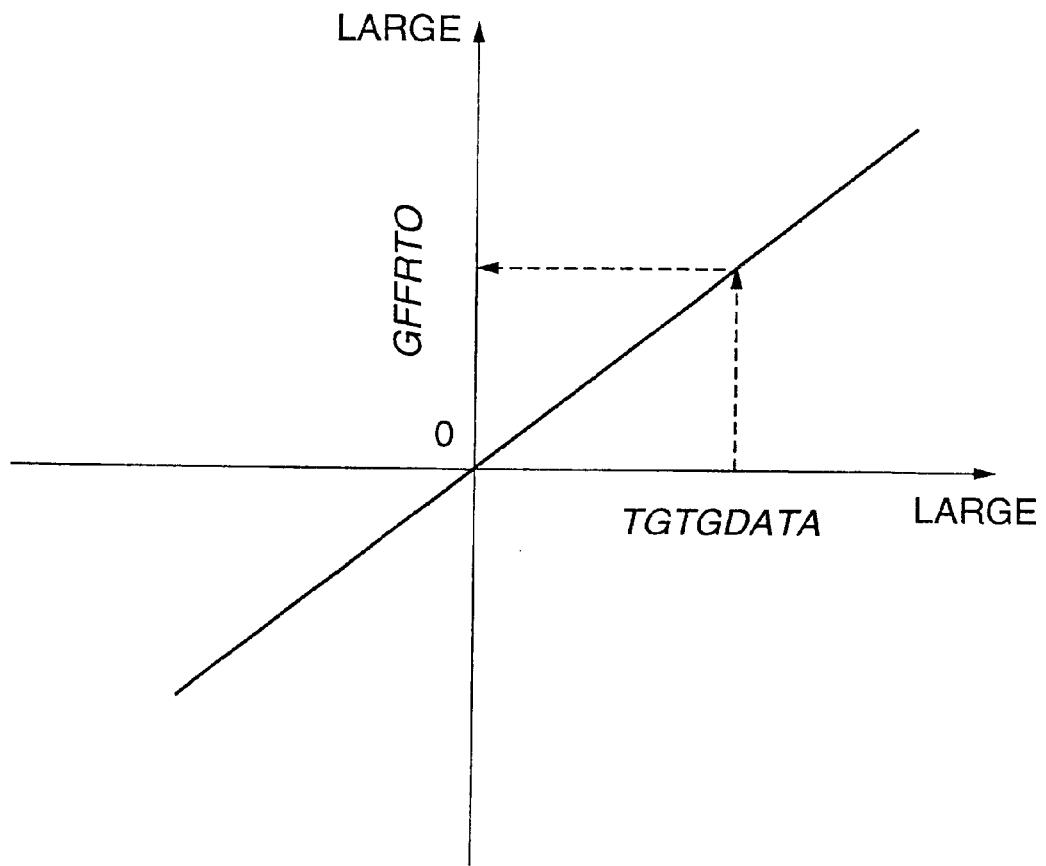
FIG. 26 is a diagram showing the characteristics of a map of a CVT speed ratio open loop control amount GFFRTO stored by the controller.

FIG. 25 shows a subroutine according to this embodiment for controlling vehicle creep torque in the forward travel range (DL) in the power recirculation mode. This subroutine replaces the subroutine of FIG. 10 of the first embodiment. The subroutine only differs from that of FIG. 10 in that the step S103 of FIG. 10 for calculating the CVT speed ratio feedback correction amount GFBRTO based on the acceleration deviation gerr is replaced by a step S 103A. The other steps are identical to those of the subroutine of FIG. 10.

In the step S103A, the controller 80 calculates a CVT speed ratio open loop correction amount GFFRTO by referring to a map previously stored in the memory of the controller 80. According to this map, the CVT speed ratio open loop correction amount GFFRTO is larger as the target vehicle acceleration TGTGDATA is larger as shown in FIG. 26.

Figure 27:
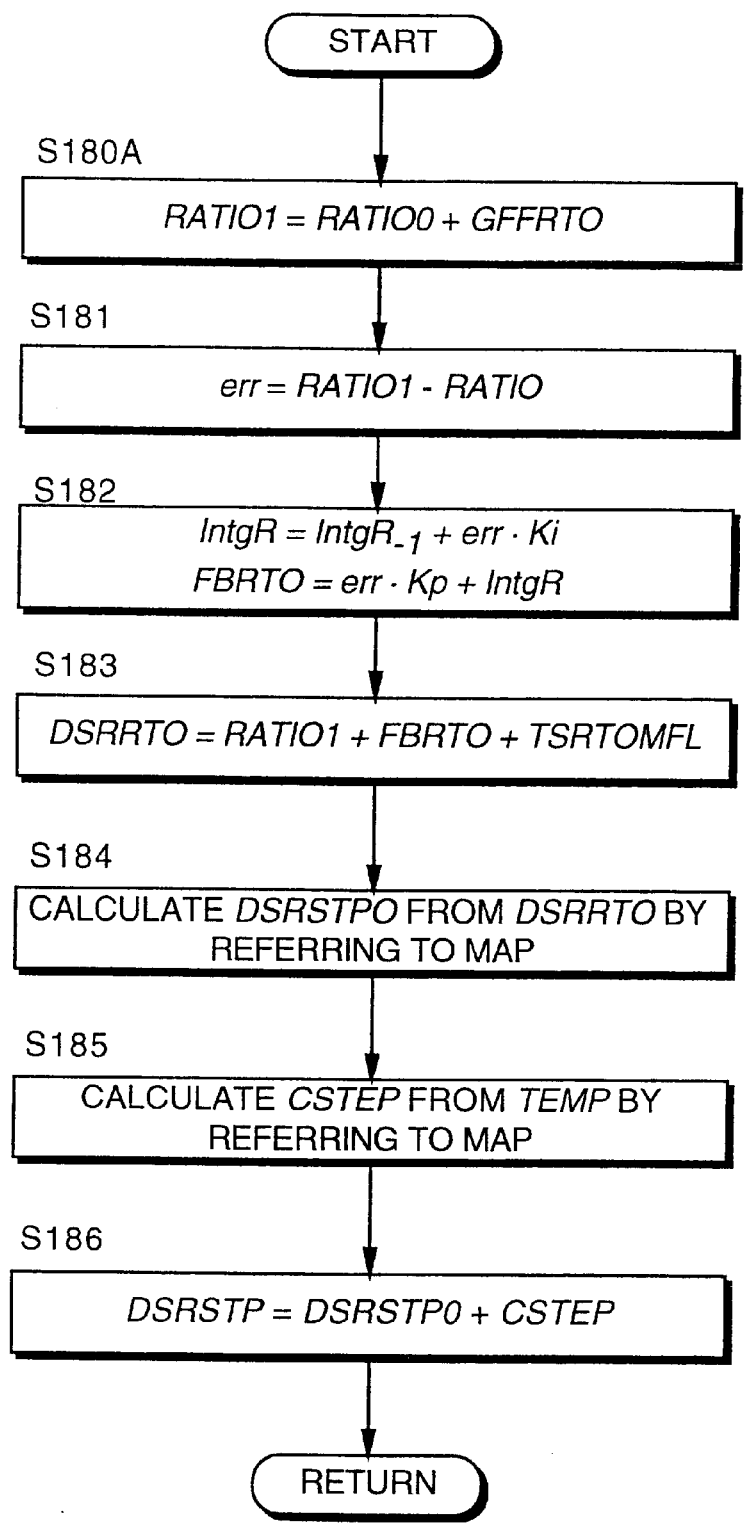
FIG. 27 is similar to FIG. 20, but showing the second embodiment of this invention.

FIG. 27 shows a subroutine according to this embodiment for calculating the command step number DSRSTP of the step motor 36 that replaces the subroutine of FIG. 20 of the first embodiment.

This subroutine only differs from that of FIG. 20 in that the step S180 for calculating the corrected transient target CVT speed ratio RATIO1 by applying the CVT speed ratio feedback correction amount GFBRTO is replaced by a step 180A. The other steps are identical to those of the subroutine of FIG. 20.

In the step S180A, the controller 80 calculates the corrected transient target CVT speed ratio RATIO1 by adding the CVT speed ratio open loop correction amount GFFRTO calculated in the step S103A to the transient target CVT speed ratio RATIO0. According also to this embodiment, the generated creep torque is always consistent with the driver's intention.

The contents of Tokugan 2001-66289 with a filing date of Mar. 9, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the accelerator pedal depression amount APS is used as a parameter for processing of the steps S92, S111, S120 and S150, however, a throttle opening sensor may be used instead of the accelerator pedal depression sensor 84, and throttle opening TVO may be used as a parameter instead of accelerator pedal depression amount APS for these processings.

Instead of the brake operation being detected by the brake switch 86, the brake operating state of the vehicle may be determined by detecting hydraulic pressure which activates the brake system of the vehicle or by detecting a depression amount of the brake pedal with which the vehicle is provided.

The embodiments of this invention in which an exclusive property or privilege is claimed are defined as follows:

What is claimed is:

1. A control device for an infinitely variable transmission for a vehicle, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, and an output shaft which changes a rotation direction and a rotation speed according to a difference between an output rotation speed of the continuously variable transmission and an output rotation speed of the fixed speed ratio transmission, the device comprising:

a sensor which detects a running state of the vehicle;

a sensor which detects a real vehicle acceleration; and a programmable controller programmed to:

calculate a target speed ratio of the continuously variable transmission based on the running state of the vehicle;

set a target vehicle acceleration based on the running state of the vehicle;

calculate an acceleration deviation of the target vehicle acceleration from the real vehicle acceleration;

determine if a predetermined creep torque control condition holds based on the running state of the vehicle;

calculate a corrected target speed ratio, if the predetermined condition holds, to cause the acceleration deviation to decrease; and control the speed ratio of the continuously variable transmission based on the corrected target speed ratio.

2. The control device as defined in claim 1, wherein the controller is further programmed to set a transient target speed ratio of the infinitely variable transmission based on the running state, calculate a transient target speed ratio of the continuously variable transmission from the transient target speed ratio of the infinitely variable transmission, calculate a feedback correction amount based on the deviation of the target vehicle acceleration and the real vehicle acceleration, and calculate the corrected target speed ratio by adding the feedback correction amount to the transient target speed ratio of the continuously variable transmission.

3. The control device as defined in claim 1, wherein the vehicle running state detecting sensor comprises a sensor which detects a depression state of an accelerator pedal with which the vehicle is provided, and the controller is further programmed to determine that the predetermined condition is not established when the accelerator pedal is depressed.

4. The control device as defined in claim 1, wherein the vehicle running state detecting sensor comprises a sensor which detects a vehicle speed, and the controller is further programmed to determine that the predetermined condition does not hold when the vehicle speed is greater than a predetermined vehicle speed.

5. The control device as defined in claim 1, wherein the vehicle running state detecting sensor comprises a sensor which detects an operation state of a brake with which the vehicle is provided, and the controller is further programmed to set the target vehicle acceleration when the brake is operating to a smaller value than when the brake is not operating.

6. The control device as defined in claim 1, wherein the vehicle running state detecting sensor comprises a sensor which detects a depression state of an accelerator pedal with which the vehicle is provided, and the controller is further programmed to set a target output torque of the output shaft according to the depression state of the accelerator pedal and calculate the target vehicle acceleration from the target output torque.

7. The control device as defined in claim 6, wherein the vehicle running state detecting sensor further comprises a sensor which detects an operation state of a brake with which the vehicle is provided, and the controller is further programmed to set the target output torque when the brake is operating to a smaller value than when the brake is not operating.

8. The control device as defined in claim 6, wherein controller is further programmed to calculate a torque shift compensation amount based on the target output torque and control the speed ratio of the continuously variable transmission to a sum of the corrected target speed ratio and the torque shift compensation amount.

9. The control device as defined in claim 1, wherein the vehicle running state detecting sensor comprises a sensor which detects whether or not the vehicle is at rest, and the controller is further programmed to control the speed ratio of the continuously variable transmission to cause the rotation speed of the output shaft to become zero when the vehicle is at rest.

10. The control device as defined in claim 1, wherein the real vehicle acceleration detecting sensor comprises a sensor which detects a vehicle speed and the controller programmed to calculate the real vehicle acceleration from a variation in the vehicle speed.

11. A control device for an infinitely variable transmission for a vehicle, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, and an output shaft which changes a rotation direction and a rotation speed according to a difference between an output rotation speed of the continuously variable transmission and an output rotation speed of the fixed speed ratio transmission, the device comprising:
  means for detecting a running state of the vehicle;
  means for detecting a real vehicle acceleration; and
  means for calculating a target speed ratio of the continuously variable transmission based on the running state of the vehicle;
  means for setting a target vehicle acceleration based on the running state of the vehicle;
  means for calculating an acceleration deviation of the target vehicle acceleration from the real vehicle acceleration;
  means for determining if a predetermined creep torque control condition holds based on the running state of the vehicle;
  means for calculating a corrected target speed ratio, if the predetermined condition holds, to cause the acceleration deviation to decrease; and
  means for controlling the speed ratio of the continuously variable transmission based on the corrected target speed ratio.

12. A control method for an infinitely variable transmission for a vehicle, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, and an output shaft which changes a rotation direction and a rotation speed according to a difference between an output rotation speed of the continuously variable transmission and an output rotation speed of the fixed speed ratio transmission, the method comprising:
  detecting a running state of the vehicle;
  detecting a real vehicle acceleration;
  calculating a target speed ratio of the continuously variable transmission based on the running state of the vehicle;
  setting a target vehicle acceleration based on the running state of the vehicle;
  calculating an acceleration deviation of the target vehicle acceleration from the real vehicle acceleration;
  determining if a predetermined creep torque control condition holds based on the running state of the vehicle;
  calculating a corrected target speed ratio, if the predetermined condition holds, to cause the acceleration deviation to decrease; and
  controlling the speed ratio of the continuously variable transmission based on the corrected target speed ratio.

13. A control device for an infinitely variable transmission for a vehicle, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, and an output shaft which changes a rotation direction and a rotation speed according to a difference between an output rotation speed of the continuously variable transmission and an output rotation speed of the fixed speed ratio transmission, the device comprising:
  a sensor which detects a running state of the vehicle;
  a sensor which detects a real vehicle acceleration; and
  a programmable controller programmed to:
    calculate a target speed ratio of the continuously variable transmission based on the running state of the vehicle;
    set a target vehicle acceleration based on the running state of the vehicle;
    determine if a predetermined creep torque control condition holds based on the running state of the vehicle;
    calculate a corrected target speed ratio, if the predetermined condition holds, to cause a ratio of the rotation speed of the input shaft with respect to the rotation speed of the output shaft to become smaller as the target vehicle acceleration becomes larger; and
    control the speed ratio of the continuously variable transmission based on the corrected target speed ratio.

* * * * *